(12) United States Patent
Yoneda

(10) Patent No.: US 7,636,673 B2
(45) Date of Patent: Dec. 22, 2009

(54) HUMAN RESOURCE AUCTION SYSTEM, HUMAN RESOURCE AUCTION SERVER, SUBSCRIBER MANAGEMENT SERVER, LICENSE ORGANIZATION SERVER, AND APPLICATION PROGRAM

(75) Inventor: Takeshi Yoneda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1197 days.

(21) Appl. No.: 10/097,518

(22) Filed: Mar. 15, 2002

(65) Prior Publication Data
US 2003/0158807 A1 Aug. 21, 2003

(30) Foreign Application Priority Data
Aug. 6, 2001 (JP) .............................. 2001-237962

(51) Int. Cl.
G06Q 40/00 (2006.01)
(52) U.S. Cl. ......................................... 705/26; 705/37
(58) Field of Classification Search ................... 705/35, 705/37, 26
See application file for complete search history.

(56) References Cited

U.S. PATENT DOCUMENTS

| 7,080,117 B2 * | 7/2006 | de Pinto et al. ............. 709/203 |
| 7,260,724 B1 * | 8/2007 | Dickinson et al. ........... 713/182 |
| 2004/0107192 A1 * | 6/2004 | Joao ............................... 707/3 |

FOREIGN PATENT DOCUMENTS

| JP | 06-004555 A | 1/1994 |
| JP | 09-297792 A | 11/1997 |
| JP | 11-066182 A | 3/1999 |
| JP | 11338881 A | 12/1999 |
| JP | 2000-066590 A | 3/2000 |

(Continued)

OTHER PUBLICATIONS

Katsuyuki Sugiyama, The Forefront of Internet Business (2nd Installment in a Series), Business Personal Computing, Dempa Publications Inc., Tokyo, Japan, vol. 17, No. 1, Jan. 1, 1999, pp. 54-59.

(Continued)

Primary Examiner—Jagdish N Patel
(74) Attorney, Agent, or Firm—Birch, Stewart, Kolasch & Birch, LLP

(57) ABSTRACT

A job seeker accesses a human resource auction site from his/her mobile telephone and registers his/her personal information therein ((1)). The human resource auction site obtains the job seeker's license certificate from a corresponding license organization ((2) and (3)). The license organization requests a communication carrier to collect a fee for the license certificate issuance ((4)). The communication carrier pays the fee to the license organization instead ((7)). The communication carrier adds the fee for license certificate issuance to a communication charge paid by the job seeker to the communication carrier so that the fee for the license certificate issuance can be collected ((8)). The human resource auction site posts personal information of the job seeker and holds a human resource auction. Recruiting companies participate in the auction and each of them places a bid for a salary payable to the job seeker who matches the job requirements by the recruiting company ((5)). A recruiting company having offered the highest salary can successfully bid ((6)).

16 Claims, 31 Drawing Sheets

FOREIGN PATENT DOCUMENTS

| | | | |
|---|---|---|---|
| JP | 2000-322440 | A | 11/2000 |
| JP | 2001028002 | A | 1/2001 |
| JP | 2001-188757 | A | 7/2001 |

OTHER PUBLICATIONS

Shoko Miyagawa et al., A Method of Information Retrieval With Credibility Evaluation Using Digital Certificate, Transactions of Information Processing Society of Japan, vol. 41, No. SIG_(TOD_6)(20000515) pp. 58-70.

Takeshi Komatsubara et al., P3P For Accurately Collecting Personal Information is Nearing Practical Use, Nikkeu Internet Technology, Nikkei Business Publications, Inc., No. 30, Dec. 22, 1999; pp. 124-136.

Shoko Miyagawa et al., A Method of Information Retrieval With Credibility Evaluation Using Digital Certificate, Transactions of Information Processing Society of Japan, vol. 41, No. SIG_3(TOD_6)(20000515) pp. 58-70, pub date: May 2000.

* cited by examiner

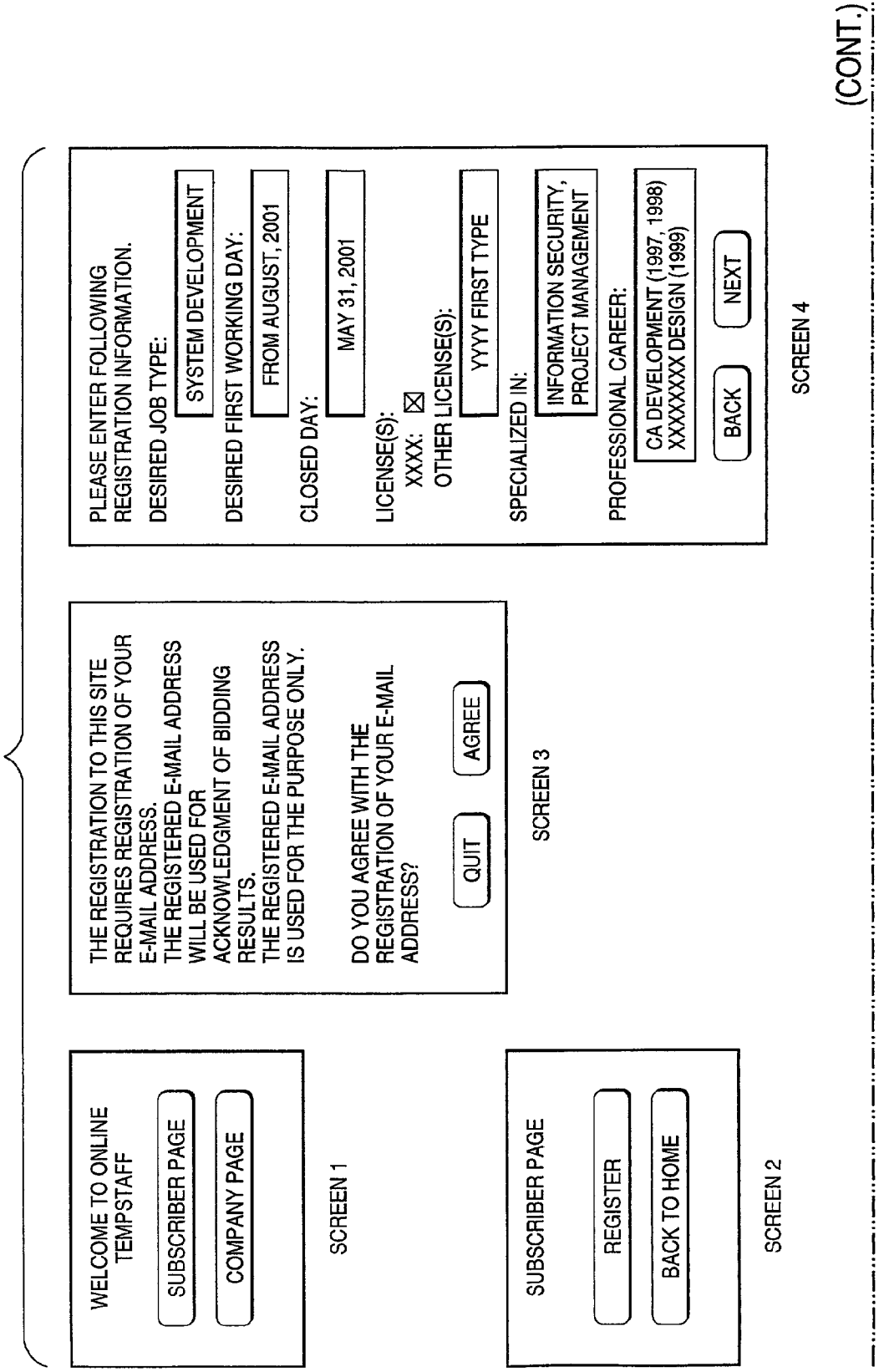

DO YOU AGREE TO PROVIDE YOUR AGE AND GENDER TO RECRUITING COMPANIES AS YOUR PERSONAL INFORMATION?
IT SHOULD BE NOTED THAT THE DISCLOSURE OF YOUR BIRTHDAY IS REQUIRED IN THIS SITE, WHICH MEANS THE DISCLOSURE OF YOUR AGE IN FACT.

DISCLOSURE OF  YES ●
YOUR AGE:  NO ○

DISCLOSURE OF  YES ●
YOUR GENDER:  NO ○

[ BACK ]  [ NEXT ]

SCREEN 5

---

THE FEE 100 YEN AND THE DISCLOSURE OF YOUR HEALTH INSURANCE CERTIFICATE NUMBER ARE NEEDED TO OBTAIN YOUR LICENSE CERTIFICATE WITH YOUR SCORE INFORMATION FROM THE XXXX ASSOCIATION.

YOUR HEALTH INSURANCE CERTIFICATE NUMBER IS USED ONLY FOR A REQUEST FOR ISSUANCE OF YOU LICENSE CERTIFICATE TO THE XXXX ASSOCIATION.

DO YOU AGREE TO PAY THE FEE 100 YEN AND THE DISCLOSURE OF YOUR HEALTH INSURANCE CERTIFICATE NUMBER?

YES ●  NO ○

[ BACK ]  [ NEXT ]

SCREEN 6

---

AN ACCESS IS REQUESTED TO YOUR FOLLOWING PERSONAL INFORMATION STORED IN YOUR MOBILE TELEPHONE.

IF THE ACCESS IS PERMITTED, PLEASE ENTER YOUR PASSWORD AND CLICK OK BUTTON. IF NOT, PLEASE CLICK CANCEL BUTTON.

· E-MAIL ADDRESS
  · BIRTHDAY
  · GENDER
  · HEALTH INSURANCE
    CERTIFICATE NUMBER

PASSWORD [ **** ]

[ CANCEL ]  [ OK ]

SCREEN 7

---

AGREEMENT FOR THE DISCLOSURE OF PERSONAL INFORMATION AND FEE PAYMENT

◆ PERSONAL INFORMATION ONLY DISCLOSED IN THIS SITE
  YOUR BIRTHDAY:
    MAY 5, 1960
  E-MAIL ADDRESS:
    yamada@aaa.com ◆ PERSRONAL INFORMATION TO BE DISCLOSED TO RECRUITING COMPANIES:
  AGE:  41 YEARS OLD
  GENDER:  MALE ◆ PERSONAL INFORMATION TO BE DISCLOSED TO THE XXXX ASSOCIATION FOR ISSUANCE OF LICENSE CERTIFICATE AND THE FEE TO BE PAID:
  HEALTH INSURANCE
  CERTIFICATE NUMBER:
    1234567
  FEE:  100 YEN

[ CANCEL ]  [ OK ]

SCREEN 8

FIG. 9

SCREEN 9

I AGREE TO SIGN FOR THE DISCLOSURE OF FOLLOWING INFORMATION.

<DISCLOSED TO>
 ONLINE TEMPSTAFF
</DISCLOSED TO>
<DATE>
 MAY 7, 2001, 14:23:30
</DATE>
<PERSONAL INFORMATION>
 <BIRTHDAY>
  APRIL 1, 1960
 </BIRTHDAY>
 <GENDER>
  MALE
 </GENDER>
 <E-MAIL ADDRESS>
  yamada@aaa.com
 </E-MAIL ADDRESS>
</PERSONAL INFORMATION>

PASSWORD [****]

[CANCEL] [OK]

SCREEN 10

I AGREE TO SIGN FOR THE DISCLOSURE OF FOLLOWING INFORMATION.

<DISCLOSED TO>
 XXXX ASSOCIATION
</DISCLOSED TO>
<DATE>
 MAY 7, 2001, 14:24:30
</DATE>
<PERSONAL INFORMATION>
 <HEALTH INSURANCE CERTIFICATE NUMBER>
  1234567
 </HEALTH INSURANCE CERTIFICATE NUMBER>
</PERSONAL INFORMATION>

PASSWORD [****]

[CANCEL] [OK]

SCREEN 11

I AGREE TO SIGN FOR THE DISCLOSURE OF FOLLOWING INFORMATION.

<PAID TO>
 XXXX ASSOCIATION
</PAID TO>
<DATE>
 MAY 7, 2001, 14:25:00
</DATE>
<AMOUNT>
 100 YEN
</AMOUNT>

PASSWORD [****]

[CANCEL] [OK]

SCREEN 12

THANK YOU FOR YOUR REGISTRATION.
THE RESULT WILL BE ACKNOWLEDGED BY E-MAIL IN MAY 31, 2001, THE LAST BIDDING DAY.

[BACK TO MAIN MENU]

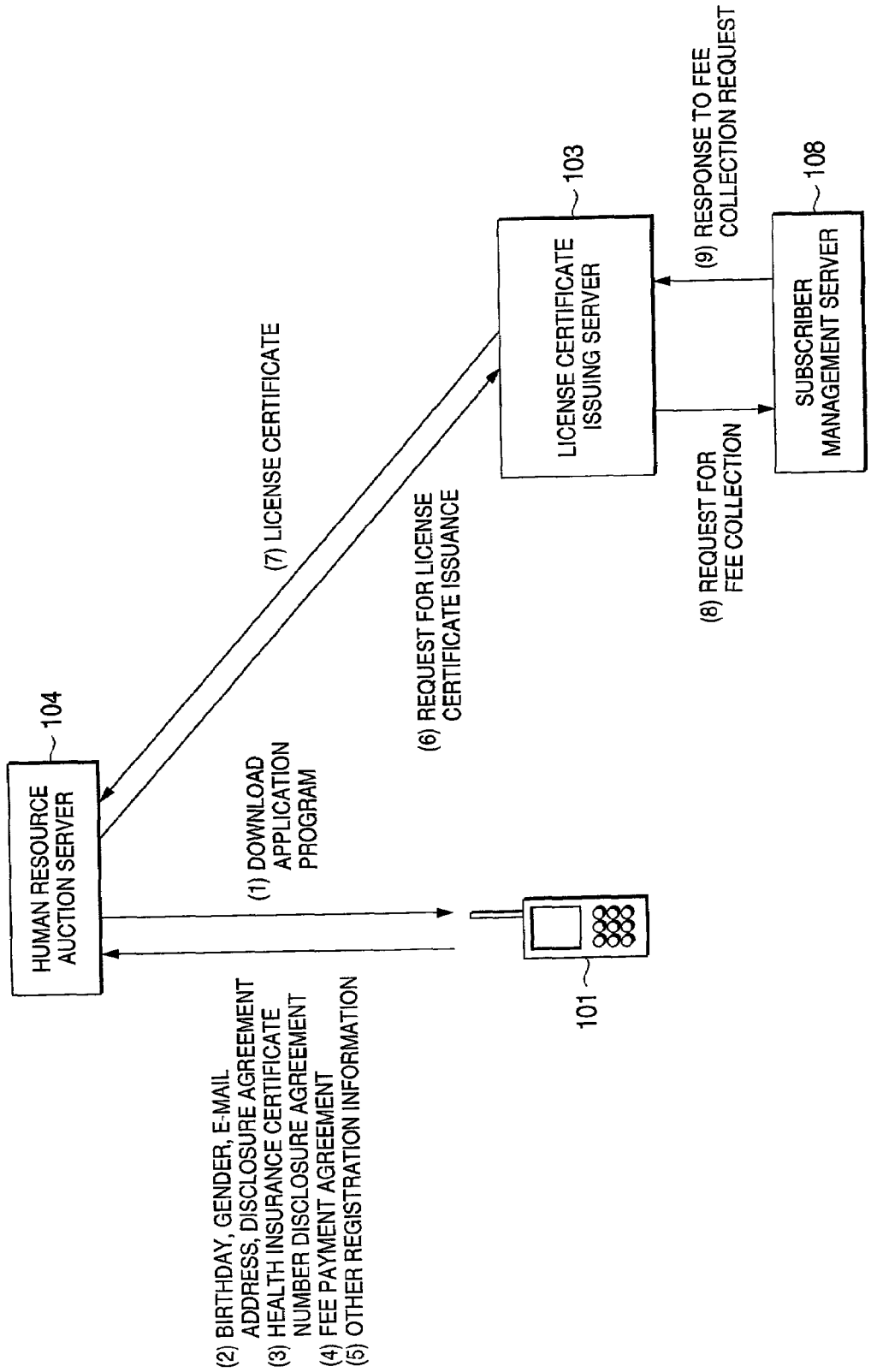

```
<PERSONAL INFORMATION DISCLOSURE AGREEMENT>
    <DISCLOSED TO>
        ONLINE TEMPSTAFF
    </DISCLOSED TO>
    <DATE>
        MAY 7, 2001, 14:23:30
    </DATE>
    <PERSONAL INFORMATION>
        <BIRTHDAY>
            MAY 5, 1960
        </BIRTHDAY>
        <GENDER>
            MALE
        </GENDER>
        <E-MAIL ADDRESS>
            yamada@aaa.com
        </E-MAIL ADDRESS>
    </PERSONAL INFORMATION>
    <SIGN>
        EF37234D3E40AB25
    </SIGN>
    <CERTIFICATE ID>
        3242
    </CERTIFICATE ID>
</PERSONAL INFORMATION DISCLOSURE AGREEMENT>
```

```
<PERSONAL INFORMATION DISCLOSURE AGREEMENT>
    <DISCLOSED TO>
        XXXX ASSOCIATION
    </DISCLOSED TO>
    <DATE>
        MAY 7, 2001, 14:24:30
    </DATE>
    <PERSONAL INFORMATION>
        <HEALTH INSURANCE CERTIFICATE NUMBER>
            1234567
        </HEALTH INSURANCE CERTIFICATE NUMBER>
    </PERSONAL INFORMATION>
    <SIGN>
        2F34AB36E4F5
    </SIGN>
    <CERTIFICATE ID>
        3242
    </CERTIFICATE ID>
</PERSONAL INFORMATION DISCLOSURE AGREEMENT>
```

FIG. 15

```
<REQUEST FOR LICENSE CERTIFICATE ISSUANCE>
    <REQUESTED BY>
        ONLINE TEMPSTAFF
    </REQUESTED BY>
    <REQUESTED DATE>
        MAY 8, 2001, 14:42:35
    </REQUESTED DATE>
    <HEALTH INSURANCE CERTIFICATE NUMBER DISCLOSURE AGREEMENT>
        <DISCLOSED TO>
            XXXXX ASSOCIATION
        </DISCLOSED TO>
        <DATE>
            MAY 7, 2001, 14:24:30
        </DATE>
        <PERSONAL INFORMATION>
        <HEALTH INSURANCE CERTIFICATE NUMBER>
            1234567
        </HEALTH INSURANCE CERTIFICATE NUMBER>
        </PERSONAL INFORMATION>
        <SIGN>
            2F34AB36E4F5
        </SIGN>
        <CERTIFICATE ID>
            3242
        </CERTIFICATE ID>
    </HEALTH INSURANCE CERTIFICATE NUMBER DISCLOSURE AGREEMENT>
    <FEE PAYMENT AGREEMENT>
        <PAID TO>
            XXXXX ASSOCIATION
        </PAID TO>
        <DATE>
            MAY 7, 2001, 14:25:00
        </DATE>
        <AMOUNT>
            100 YEN
        </AMOUNT>
        <SIGN>
            3873AC09EB
        </SIGN>
        <CERTIFICATE ID>
            3242
        </CERTIFICATE ID>
    </FEE PAYMENT AGREEMENT>
    <SIGN>
        F43BA352BBC3895
    </SIGN>
    <CERTIFICATE ID>
        9952
    </CERTIFICATE ID>
</REQUEST FOR LICENSE CERTIFICATE ISSUANCE>
```

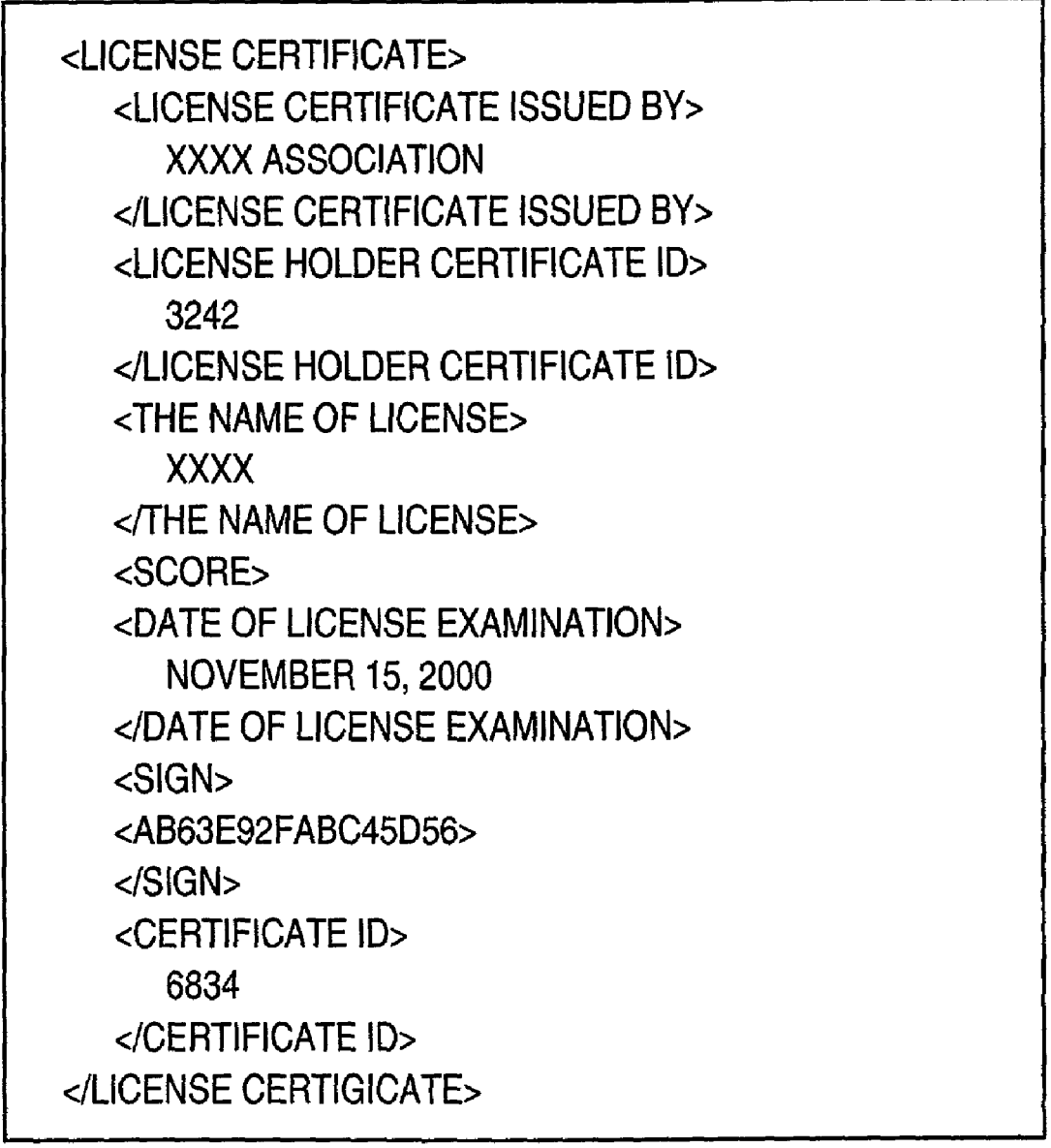

```
<LICENSE CERTIFICATE>
    <LICENSE CERTIFICATE ISSUED BY>
       XXXX ASSOCIATION
    </LICENSE CERTIFICATE ISSUED BY>
    <LICENSE HOLDER CERTIFICATE ID>
       3242
    </LICENSE HOLDER CERTIFICATE ID>
    <THE NAME OF LICENSE>
       XXXX
    </THE NAME OF LICENSE>
    <SCORE>
    <DATE OF LICENSE EXAMINATION>
       NOVEMBER 15, 2000
    </DATE OF LICENSE EXAMINATION>
    <SIGN>
    <AB63E92FABC45D56>
    </SIGN>
    <CERTIFICATE ID>
       6834
    </CERTIFICATE ID>
</LICENSE CERTIGICATE>
```

```
<REQUEST FOR FEE COLLECTION>
    <REQUESTED BY>
        XXXX ASSOCIATION
    </REQUESTED BY>
    <REQUESTED DATE>
        MAY 8, 2001, 14:45:21
    </REQUESTED DATE>
    <FEE PAYMENT AGREEMENT>
            <PAID TO>
                XXXX ASSOCIATION
            </PAID TO>
            <DATE>
                MAY 7, 2001, 14:25:00
            </DATE>
            <AMOUNT>
                100 YEN
            </AMOUNT>
            <SIGN>
                3873AC09EB
            </SIGN>
            <CERTIFICATE ID>
                3242
            </CERTIFICATE ID>
    </FEE PAYMENT AGREEMENT>
    <SIGN>
        3498734AB349EF
    </SIGN>
    <CERTIFICATE ID>
        6834
    </CERTIFICATE ID>
</REQUEST FOR FEE COLLECTION>
```

FIG. 18

```
<RESPONSE TO FEE COLLECTION REQUEST>
    <FEE COLLECTION REQUEST ACCEPTED BY>
        COMMUNICATION CARRIER A
    </FEE COLLECTION REQUEST ACCEPTED BY>
    <FEE COLLECTION REQUESTED DATE>
        MAY 8, 2001, 14:45:21
    </FEE COLLECTION REQUESTED DATE>
    <FEE WILL BE TRANSFERRED IN>
        MAY 31, 2001, 9:00
    </FEE WILL BE TRANSFERRED IN>
    <SIGN>
        FD34589EAB4536
    </SIGN>
    <CERTIFICATE ID>
        7923
    </CERTIFICATE ID>
</RESPONSE TO FEE COLLECTION REQUEST>
```

1801

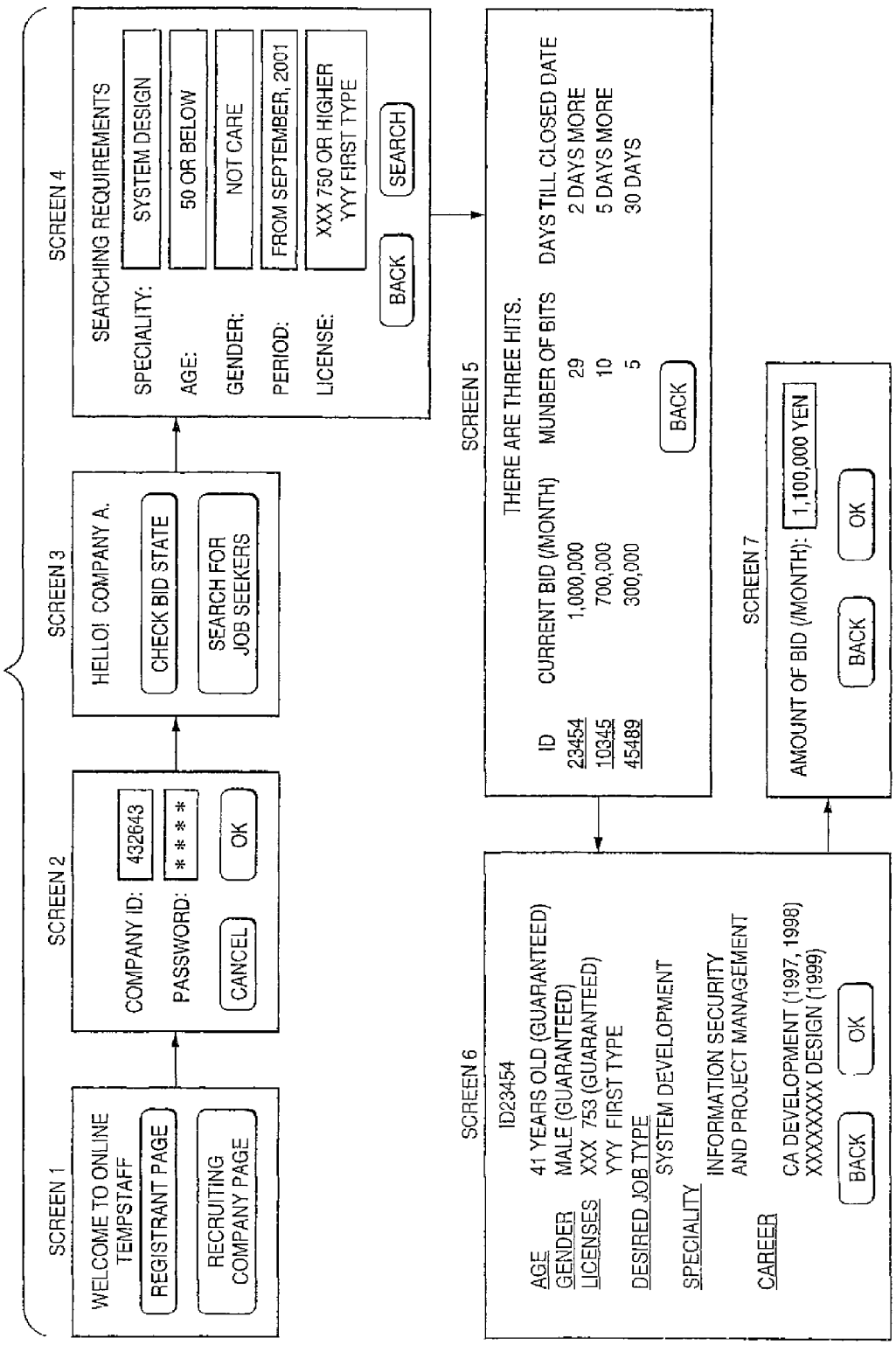

FIG. 20

```
<PERSONAL INFORMATION DISCLOSURE AGREEMENT>
    <DISCLOSED TO>
        XXXX ASSOCIATION
    </DISCLOSED TO>
    <DATE>
        MAY 7, 2001, 14:24:30
    </DATE>
    <PERSONAL INFORMATION>
        <HEALTH INSURANCE CERTIFICATE NUMBER>
            1234567
        </HEALTH INSURANCE CERTIFICATE NUMBER>
    </PERSONAL INFORMATION>
    <SIGN>
        2F34AB36E4F5
    </SIGN>
    <CERTIFICATE ID>
        3242
    </CERTIFICATE ID>
</PERSONAL INFORMATION DISCLOSURE AGREEMENT>
```

2001

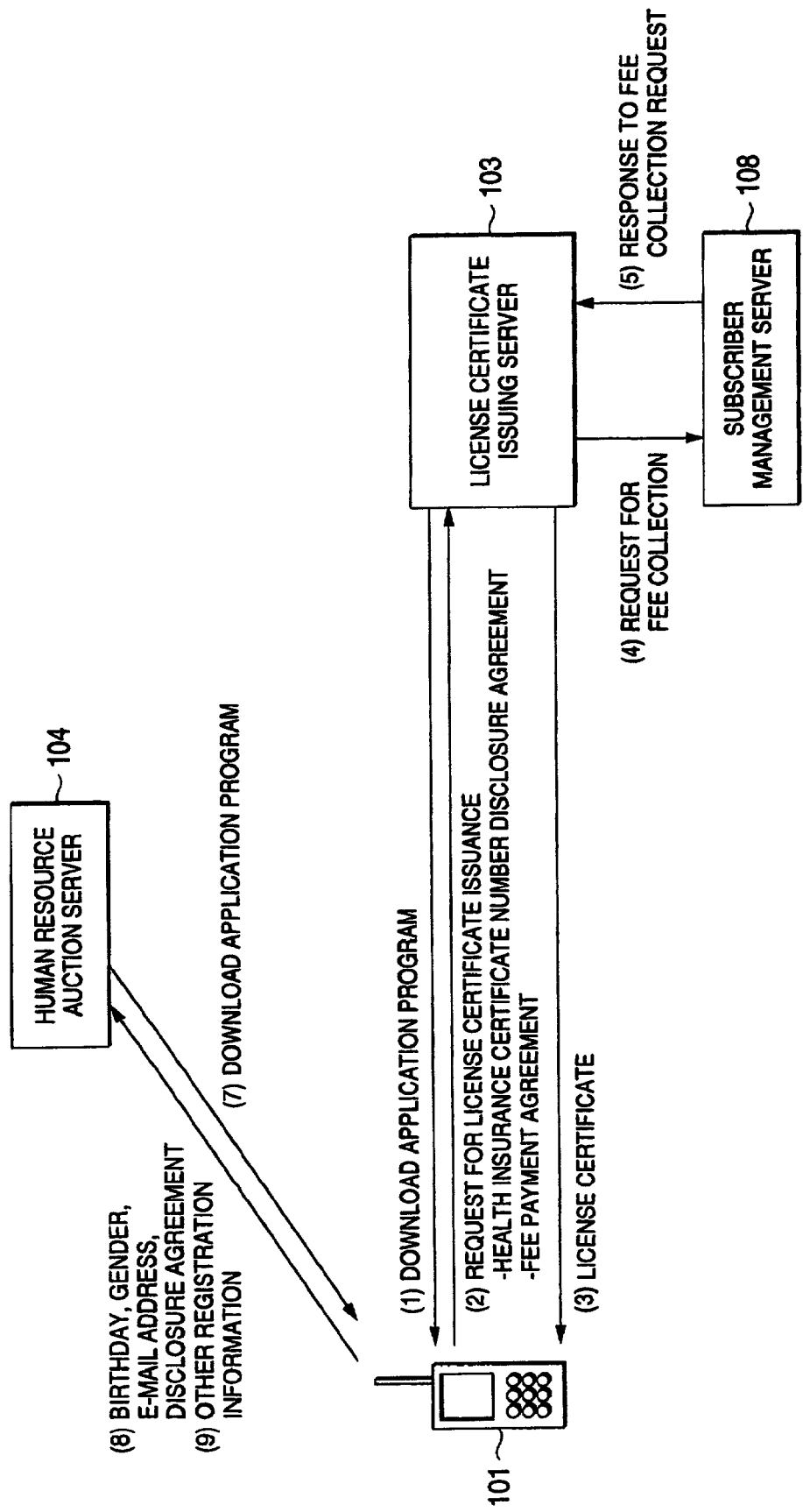

FIG. 22

SCREEN 1

WELCOME TO
XXXX ASSOCIATION

[ ISSUE LICENSE CERTIFICATE ]

SCREEN 2

THE FEE 100 YEN AND THE DISCLOSURE OF YOUR HEALTH INSURANCE CERTIFICATE NUMBER ARE NEEDED TO OBTAIN YOUR LICENSE CERTIFICATE WITH YOUR SCORE INFORMATION FROM THE XXXX ASSOCIATION.

YOUR HEALTH INSURANCE CERTIFICATE NUMBER IS USED ONLY FOR A REQUEST FOR ISSUANCE OF YOU LICENSE CERTIFICATE TO THE XXXX ASSOCIATION.

DO YOU AGREE TO PAY THE FEE 100 YEN AND THE DISCLOSURE OF YOUR HEALTH INSURANCE CERTIFICATE NUMBER?

YES ●     NO ○

[ BACK ]     [ NEXT ]

SCREEN 3

AN ACCESS IS REQUESTED TO YOUR FOLLOWING PERSONAL INFORMATION STORED IN YOUR MOBILE TELEPHONE.

IF THE ACCESS IS PERMITTED, PLEASE ENTER YOUR PASSWORD AND CLICK OK BUTTON. IF NOT, PLEASE CLICK CANCEL BUTTON.

HEALTH INSURANCE
CERTIFICATE NUMBER

PASSWORD [ **** ]

[ CANCEL ]     [ OK ]

SCREEN 4

AGREEMENT FOR THE DISCLOSURE OF PERSONAL INFORMATION AND FEE PAYMENT

◆ PERSONAL INFORMATION TO BE DISCLOSED TO THE XXXX ASSOCIATION FOR ISSUANCE OF LICENSE CERTIFICATE AND THE FEE TO BE PAID:

HEALTH INSURANCE
CERTIFICATE NUMBER:
   1234567

FEE:   100 YEN

[ CANCEL ]     [ OK ]

```
<REQUEST FOR LICENSE CERTIFICATE ISSUANCE>
    <REQUESTED BY>
    <LICENSE HOLDER CERTIFICATE ID>
        3242
    </LICENSE HOLDER CERTIFICATE ID>
    </REQUESTED BY>
    <REQUESTED DATE>
        MAY 8, 2001, 14:42:35
    </REQUESTED DATE>
    <HEALTH INSURANCE CERTIFICATE NUMBER DISCLOSURE AGREEMENT>
        <DISCLOSED TO>
            XXXXX ASSOCIATION
        </DISCLOSED TO>
        <DATE>
            MAY 7, 2001, 14:24:30
        </DATE>
        <PERSONAL INFORMATION>
        <HEALTH INSURANCE CERTIFICATE NUMBER>
            1234567
        </HEALTH INSURANCE CERTIFICATE NUMBER>
        </PERSONAL INFORMATION>
        <SIGN>
            2F34AB36E4F5
        </SIGN>
        <CERTIFICATE ID>
            3242
        </CERTIFICATE ID>
    </HEALTH INSURANCE CERTIFICATE NUMBER DISCLOSURE AGREEMENT>
    <FEE PAYMENT AGREEMENT>
        <PAID TO>
            XXXXX ASSOCIATION
        </PAID TO>
        <DATE>
            MAY 7, 2001, 14:25:00
        </DATE>
        <AMOUNT>
            100 YEN
        </AMOUNT>
        <SIGN>
            3873AC09EB
        </SIGN>
        <CERTIFICATE ID>
            3242
        </CERTIFICATE ID>
    </FEE PAYMENT AGREEMENT>
    <SIGN>
        F43BA352BBC3895
    </SIGN>
    <CERTIFICATE ID>
        9952
    </CERTIFICATE ID>
</REQUEST FOR LICENSE CERTIFICATE ISSUANCE>
```

FIG. 24

```
<LICENSE CERTIFICATE>
    <LICENSE CERTIFICATE ISSUED BY>
        XXXX ASSOCIATION
    </LICENSE CERTIFICATE ISSUED BY>
    <LICENSE HOLDER CERTIFICATE ID>
        3242
    </LICENSE HOLDER CERTIFICATE ID>
    <THE NAME OF LICENSE>
        XXXX
    </THE NAME OF LICENSE>
    <SCORE>
        753
    </SCORE>
    <DATE OF LICENSE EXAMINATION>
        NOVEMBER 15, 2000
    </DATE OF LICENSE EXAMINATION>
    <SIGN>
    <AB63E92FABC45D56>
    </SIGN>
    <CERTIFICATE ID>
        6834
    </CERTIFICATE ID>
</LICENSE CERTIGICATE>
```

```
<REGISTRATION INFORMATION>
    <DESIRED JOB TYPE>
        SYSTEM DEVELOPMENT
    </DESIRED JOB TYPE>
    <DESIRED FIRST WORKING DAY>
        FROM AUGUST, 2001
    </DESIRED FIRST WORKING DAY>
    <CLOSED DATE>
        MAY 31, 2001
    </CLOSED DATE>
    <LICENSES>
        XXXX, YYYY FIRST TYPE
    </LICENSES>
        <LICENSE CERTIFICATE>
            <LICENSE CERTIFICATE ISSUED BY>
                XXXX ASSOCIATION
            </LICENSE CERTIFICATE ISSUED BY>
            <LICENSE HOLDER CERTIFICATE ID>
                3242
            </LICENSE HOLDER CERTIFICATE ID>
            <THE NAME OF LICENSE>
                XXXX
            </THE NAME OF LICENSE>
            <SCORE>
                753
            </SCORE>
            <DATE OF LICENSE EXAMINATION>
                NOVEMBER 15, 2000
            </DATE OF LICENSE EXAMINATION>
            <SIGN>
                AB63E92FABC45D56
            </SIGN>
            <CERTIFICATE ID>
                6834
            </CERTIFICATE ID>
        </LICENSE CERTIFICATE>
    <SPECIALIZED IN>
        INFORMATION SECURITY, PROJECT MANAGEMENT
    </SPECIALIZED IN>
    <PROFESSIONAL CAREER>
        CA DEVELOPMENT (1997, 1998), XXXXXXXX DESIGN (1999)
    </PROFESSIONAL CAREER>
</REGISTRATION INFORMATION>
```

<NAME> <ADDRESS> <TELEPHONE NUMBER> <E-MAIL ADDRESS>
<GENDER> <BIRTHDAY> <HEALTH INSURANCE CERTIFICATE NUMBER>

FIG. 29

```
<ADDRESS>
1-1-1 SHINCHO, KODAIRA CITY, TOKYO
</ADDRESS>

<E-MAIL ADDRESS>
yamada@aaa.com
</E-MAIL ADDRESS>
```

FIG. 30

```
<NAME>            <TELEPHONE NUMBER>   <GENDER>   <BIRTHDAY>      <HEALTH INSURANCE CERTIFICATE NUMBER>
TARO YAMADA       0423999999           MALE       MAY 5, 19660    0123456
</NAME>           </TELEPHONE NUMBER>  </GENDER>  </BIRTHDAY>     </HEALTH INSURANCE CERTIFICATE NUMBER>
```

FIG. 31

SCREEN 1

ONLINE SHOPPING SITE

[TO REGISTRATION] [CANCEL]

SCREEN 2

AN ACCESS IS REQUESTED TO YOUR FOLLOWING PERSONAL INFORMATION STORED IN YOUR MOBILE TELEPHONE.

IF THE ACCESS IS PERMITTED, PLEASE ENTER YOUR PASSWORD AND CLICK OK BUTTON.
IF NOT, PLEASE CLICK CANCEL BUTTON.

· NAME
· GENDER
· ADDRESS
· TELEPHONE NUMBER

PASSWORD [****]

[CANCEL] [OK]

SCREEN 3

PLEASE ENTER FOLLOWING REGISTRATION INFORMATION.

NAME: [TARO YAMADA]
GENDER: MALE ● FEMALE ○
ADDRESS: [1-1-1 SHINCHO, KODAIRA CITY, TOKYO]
TELEPHONE NUMBER: [0423999999]

[OK] [CANCEL]

SCREEN 4

PLEASE ENTER FOLLOWING REGISTRATION INFORMATION.

NAME: [ ]
GENDER: MALE ● FEMALE ○
ADDRESS: [ ]
TELEPHONE NUMBER: [ ]

[OK] [CANCEL]

FIG. 32

```
<SIGNED NAME>
  <NAME>
    TARO YAMADA
  </NAME>
  <IDENTIFICATION CERTIFICATE ID>
    3242
  </IDENTIFICATION CERTIFICATE ID>
  <SIGNED PERSON CERTIFICATE ID>
    5643
  </SIGNED PERSON CERTIFICATE ID>
  <SIGN>
    234FE45AB
  </SIGN>
</SIGNED NAME>
```

```
<SIGNED ADDRESS>
  <ADDRESS>
    X-X-X, MINATO-KU, TOKYO
  </ADDRESS>
  <IDENTIFICATION CERTIFICATE ID>
    3242
  </IDENTIFICATION CERTIFICATE ID>
  <SIGNED PERSON CERTIFICATE ID>
    5643
  </SIGNED PERSON CERTIFICATE ID>
  <SIGN>
    9868AB234EE
  </SIGN>
</SIGNED ADDRESS>
```

```
<SIGNED GENDER>
  <GENDER>
    MALE
  </GENDER>
  <IDENTIFICATION CERTIFICATE ID>
    3242
  </IDENTIFICATION CERTIFICATE ID>
  <SIGNED PERSON CERTIFICATE ID>
    5643
  </SIGNED PERSON CERTIFICATE ID>
  <SIGN>
    45AB234CDF
  </SIGN>
</SIGNED GENDER>
```

```
<SIGNED BIRTHDAY>
  <BIRTHDAY>
    APRIL 1, 1960
  </BIRTHDAY>
  <IDENTIFICATION CERTIFICATE ID>
    3242
  </IDENTIFICATION CERTIFICATE ID>
  <SIGNED PERSON CERTIFICATE ID>
    5643
  </SIGNED PERSON CERTIFICATE ID>
  <SIGN>
    98A923EF51
  </SIGN>
</SIGNED BIRTHDAY>
```

```
<SIGNED HEALTH INSURANCE CERTIFICATE NUMBER>
  <HEALTH INSURANCE CERTIFICATE NUMBER>
    1234567
  </HEALTH INSURANCE CERTIFICATE NUMBER>
  <IDENTIFICATION CERTIFICATE ID>
    3242
  </IDENTIFICATION CERTIFICATE ID>
  <SIGNED PERSON CERTIFICATE ID>
    5643
  </SIGNED PERSON CERTIFICATE ID>
  <SIGN>
    4958394ABCE4
  </SIGN>
</SIGNED HEALTH INSURANCE CERTIFICATE NUMBER>
```

<PERSONAL INFORMATION DISCLOSURE AGREEMENT>
  <DISCLOSED TO>
    XXXX ASSOCIATION
  </DISCLOSED TO>
  <DATE>
    MAY 7, 2001, 14:24:30
  </DATE>
  <PERPSONAL INFORMATION>

<SIGNED HEALTH INSURANCE CERTIFICATE NUMBER>
    <HEALTH INSURANCE CERTIFICATE NUMBER>
      1234567
    </HEALTH INSURANCE CERTIFICATE NUMBER>
    <IDENTIFICATION CERTIFICATE ID>
      3242
    </IDENTIFICATION CERTIFICATE ID>
    <SIGNED PERSON CERTIFICATE ID>
      5643
    </SIGNED PERSON CERTIFICATE ID>
    <SIGN>
      4958394ABCE4
    </SIGN>
    </SIGNED HEALTH INSURANCE CERTIFICATE NUMBER>

</PERSONAL INFORMATION>
  <SIGN>
    2F34AB36E4F5
  </SIGN>
  <CERTIFICATE ID>
    3242
  </CERTIFICATE ID>
</PERSONAL INFORMATION DISCLOSURE AGREEMENT>

HUMAN RESOURCE AUCTION SYSTEM, HUMAN RESOURCE AUCTION SERVER, SUBSCRIBER MANAGEMENT SERVER, LICENSE ORGANIZATION SERVER, AND APPLICATION PROGRAM

BACKGROUND OF THE INVENTION

1. Field of the Invention

The present invention relates to a human resource auction system, a human resource auction server, a subscriber management server, a license organization server and an application program for mediating between job seekers and recruiting companies over a network.

2. Description of the Related Art

Conventional human resource auction systems uses subjective input information from job seekers without using objective ability information from license organization, as described in Laid-Open Patent Publication 338881/1999, for example.

The conventional human resource auction systems do not have a way for using objective ability information from reliable license organizations (called XXXX Association hereinafter) safely. Therefore, an ability of a job seeker is not determined whether or not it matches with what a recruiting company needs until the time of interview or after employment. It increases the cost of personnel employment of recruiting companies.

It is because, when it is determined that the person's ability does not match with the company needs as a result of interview, the time taken for interview is waste of time. Further, if the mismatch is realized after the employment, the salary having already paid to the person is also waste of money.

On the other hand, the conventional system is not efficient for job seekers, either. It is because it is much waste of time for job seekers to have many interviews which do not connect to employment.

SUMMARY OF THE INVENTION

Accordingly, it is an object of the present invention to achieve right and quick matching between needs of both job seekers and recruiting companies, which reduces costs on both parties. Further, it is another object of the present invention to provide an advantageous system for causing a license organization such as XXXX Association to issue an electronic license certificate.

According to one aspect of the present invention, there is provided a human resource auction system wherein the client in the recruiting company uses the license certificate provided by the license organization as objective ability information of the job seeker.

According to another aspect of the present invention, there is provided a human resource auction system wherein the subscriber management server of the communication carrier collects a fee for license issuance as a communication charge from an account of a user instead of the license organization server.

According to another aspect of the present invention, there is provided a human resource auction system wherein the license organization server of the license organization issues and sends to the job seeker terminal a license certificate in accordance with a request from the job seeker terminal, and the job seeker terminal stores the license certificate provided by the license organization server.

According to another aspect of the present invention, there is provided a human resource auction system wherein the license organization server of the license organization downloads an application program to the job seeker terminal for displaying a screen for asking agreement for obtaining a license certificate to the job seeker, and, when a request for license issuance sent by the job seeker terminal is received under the agreement by the job seeker based on the application program, the license organization server issues and sends to the job seeker terminal the license, which is in turn stored by the job seeker terminal.

According to another aspect of the present invention, there is provided a human resource auction system wherein the human resource auction server obtains, from the job seeker, contents of personal information of the job seeker and where the contents can be disclosed, downloads an application program to the job seeker terminal for obtaining information indicating whether or not the job seeker agrees, and discloses to a disclosed server the contents of the personal information of the job seeker and where the contents can be disclosed, which are obtained from the job seeker terminal under agreement by the job seeker based on the application program.

According to another aspect of the present invention, there is provided a human resource auction system wherein the job seeker terminal sends encoded personal information, which can be decoded by the specified license organization server only, to the license organization server.

According to another aspect of the present invention, there is provided a human resource auction system wherein the human resource auction server downloads to the job seeker terminal an application program for obtaining information indicating whether or not the job seeker agrees on fee payment for license certificate issuance and, if the agreement is realized by the application program, notifies to the license organization server that the fee payment is agreed by the job seeker, and the license organization server issues and transfers to the human resource auction server a license certificate based on the agreement on the fee payment.

According to another aspect of the present invention, there is provided a human resource auction system wherein the job seeker terminal stores a heading of personal information on a storage area which can be read without any password, and an application program running on the job seeker terminal searches the storage area so that the heading of personal information stored in the job seeker terminal can be identified, and, in accordance with permission of the job seeker, the application program can read applicable contents of personal information from an area which cannot be read without permission of the job seeker and enters the applicable contents in a personal information entering field on a screen.

According to another aspect of the present invention, there is provided a human resource auction system wherein each piece of personal information is signed by the subscriber management server and stored in the job seeker terminal.

According to another aspect of the present invention, there is provided an auction server wherein, when personal information of the job seeker is received from the job seeker terminal at the time of registration in an auction, the auction server identifies job seeker's license information in the personal information, obtains a license certificate relating to the job seeker from the license organization server corresponding to the identified job seeker's license, and discloses the license certificate to the client of the recruiting company.

According to another aspect of the present invention, there is provided a subscriber management server wherein the subscriber management server collects a fee for license issuance as a communication charge from an account of a user instead of the license organization server.

According to another aspect of the present invention, there is provided a license organization server wherein the license organization server issues and sends to the job seeker terminal a license certificate in accordance with a request from the job seeker terminal.

According to another aspect of the present invention, there is provided a human resource auction server wherein the human resource auction server obtains, from the job seeker, contents of personal information of the job seeker and where the contents can be disclosed, downloads an application program to the job seeker terminal for obtaining information indicating whether or not the job seeker agrees, and discloses to a disclosed server the contents of the personal information of the job seeker and where the contents can be disclosed, which are obtained from the job seeker terminal under agreement by the job seeker based on the application program.

According to another aspect of the present invention, there is provided a license server wherein the license organization server receives, from the job seeker terminal, encoded personal information, which can be decoded by the license organization server only.

According to another aspect of the present invention, there is provided a human resource auction server wherein the human resource auction server downloads to the job seeker terminal, an application program for obtaining information indicating whether or not the job seeker agrees on fee payment for license certificate issuance, notifies to the license organization server that the fee payment is agreed by the job seeker if the agreement is realized by the application program, and obtains a license certificate based on the agreement on the fee payment.

According to another aspect of the present invention, there is provided a subscriber management server wherein each piece of personal information is signed by the subscriber management server and stored in the job seeker terminal.

According to another aspect of the present invention, there is provided an application program wherein the application program runs on the job seeker terminal, transfers personal information of the job seeker to the license organization server under the permission of the job seeker, and obtains and stores a license certificate from the license organization server.

In that case, the application program may be downloaded from the human resource auction server to the job seeker terminal.

According to another aspect of the present invention, there is provided an application program wherein the application program runs on the job seeker terminal displays a screen for prompting the job seeker to select contents of personal information and where the contents can be disclosed, then displays a screen prompting the job seeker to select whether or not he/she agrees on the disclosure of the personal information, and if information regarding agreement on the disclosure of the personal information is received, transfers the agreement information to the human resource auction server.

In that case, the application program may be downloaded from the human resource auction server to the job seeker terminal.

According to another aspect of the present invention, there is provided an application program wherein the application program runs on the job seeker terminal, displays a screen for prompting the job seeker to select whether or not he/she agrees on payment for a fee for obtaining a license certificate, and if information regarding agreement on the fee payment is received, transfers the fee payment agreement information to the human resource auction server.

In that case, the application program may be downloaded from the human resource auction server to the job seeker terminal.

Therefore, the needs of both job seeker and recruiting company can be matched accurately and quickly, which allows the reduction of costs on both of them. The electronic license certificate can be issued securely. Additionally, the license organization and the communication carrier can get earnings through the issuance of the license certificate. Further, the job seeker can reuse the license certificate. Further, since only the information agreed for the disclosure is disclosed, the illegal leak of personal information can be prevented. The server having obtained personal information indirectly provides a way for checking if the personal information is disclosed in accordance with the agreement by the person that the personal information belongs to. Therefore, the use of illegally leaked personal information can be prevented. Further, the job seeker can provide his/her health insurance certificate number which is personal information to the license certificate issuing server without the disclosure to the human resource auction server. In addition, the human resource auction server does not need to prevent the leakage of the health insurance certificate number, which is personal information and is actually not needed by the human resource auction server. Therefore, the cost reduction can be achieved. Further, the user can prevent the illegal leak of his/her personal information and can reduce the step of complicated personal information inputting. Further, the server which receives the personal information can realize that those pieces of the personal information are guaranteed by the subscriber registration organization. As a result, it can be prevented that a user creates false personal information on purpose, signs on the false personal information and sends it to the server. Since the application program is downloaded from the human resource auction server to the job seeker's terminal, the version-up of the application can be handled in a flexible way.

BRIEF DESCRIPTION OF THE DRAWINGS

FIG. 8 is a diagram of an example of a screen showing the steps of registering ability information of a job seeker to a human resource auction server;

FIG. 9 is a diagram showing an example of a signing screen for asking a job seeker to agree to disclose his/her personal information in the course of registration of his/her ability information to the human resource auction server;

FIG. 10 is an explanatory diagram showing the steps of registering job seeker's ability information to the human resource auction server;

FIG. 11 is a diagram showing data on a agreement for disclosing the job seeker's birthday, gender, and e-mail address;

FIG. 12 is a diagram showing data on a agreement for disclosing the job seeker's health insurance certificate number;

FIG. 15 is a diagram showing data on a request for issuing a license certificate;

FIG. 16 is a diagram showing data on the license certificate;

FIG. 17 is a diagram showing data on a request for fee collection;

FIG. 18 is a diagram showing data on a response to the request for fee collection;

FIG. 19 is a diagram showing an example of a screen for the steps of operating a human resource auction;

FIG. 20 is a diagram showing data on a agreement for disclosing the health insurance number;

FIG. 21 is an explanatory diagram showing an outline of an operation according to a third embodiment;

FIG. 22 is a diagram showing an example of a screen of user's mobile telephone;

FIG. 23 is a diagram showing data on a request for issuing a license certificate;

FIG. 24 is a diagram showing data on the license certificate;

FIG. 26 is a diagram showing data on registered information;

FIG. 29 is a diagram showing tagged personal information stored in a personal information storage portion in the mobile telephone;

FIG. 30 is a diagram showing tagged personal information stored in a personal information storage portion in the mobile telephone;

FIG. 31 is a diagram showing an example of a screen of the steps of an operation according to a fourth embodiment;

FIG. 32 is a diagram showing data on signed personal information; and

FIG. 33 is a diagram showing data on a agreement for disclosing personal information.

DESCRIPTION OF THE PREFERRED EMBODIMENTS

First Embodiment

Figure 1:
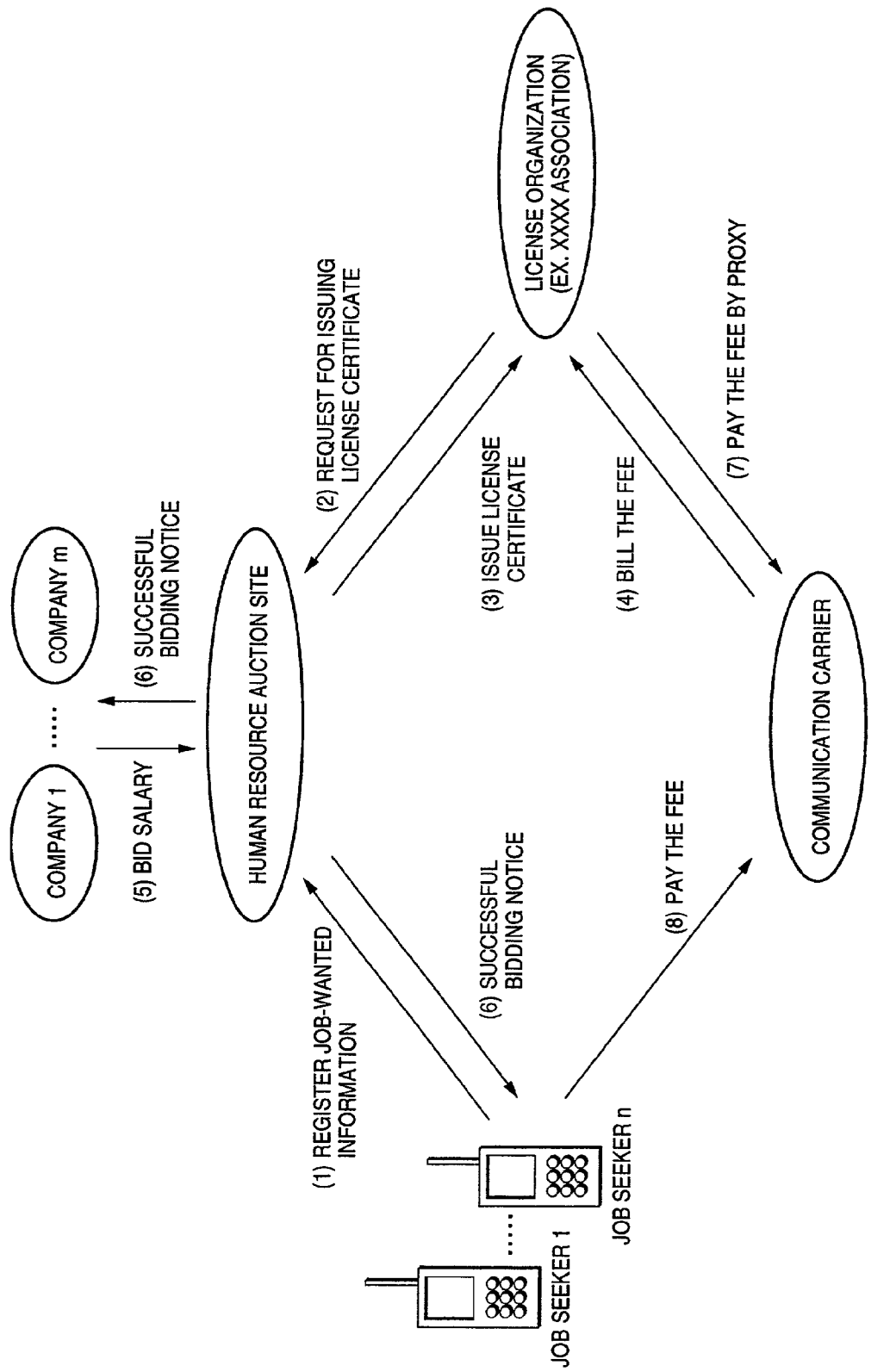
FIG. 1 is an explanatory diagram showing an outline of an operation according to a first embodiment.

An outline of a first embodiment of the present invention will be described with reference to FIG. 1.

A plurality of job seekers, a plurality of recruiting companies, a communication carrier, and a license organization participate in a human resource auction system.

In a mobile telephone owned by the job seeker, personal information such as job seeker's name, address, gender, birthday, e-mail address, and health insurance number is registered safely through a communication carrier at the time of subscription. Further, a private key which is unique to the subscriber according to a public key encoding method is stored in the mobile telephone.

A job seeker accesses a human resource auction site from his/her mobile telephone and registers his/her ability, desired condition for a job and personal information therein ((1)). The personal information disclosed at the time of registration can be selected by the job seeker, and his/her sign showing his/her agreement to the disclosure is added to the disclosed personal information.

The human resource auction site obtains a license certificate showing the validity of the license registered by the job seeker from a corresponding license organization ((2) and (3)).

The license organization requests a communication carrier to collect a fee for issuing the license certificate to be collected from the license holder himself/herself ((4)). The communication carrier pays the fee to the license organization instead ((7)). Here, a fee collection charge is collected from the license organization. The communication carrier collects the fee for issuing the license certificate from user's account by adding the fee for issuing the license certificate to a communication charge to be paid by the job seeker to the communication carrier ((8)).

The human resource auction site posts the job seeker's ability, desired job condition and personal information thereon and holds a human resource auction.

Recruiting companies participate in the auction and bid respective monthly salaries to be paid to the job seeker who matches with their recruiting requirement ((5)).

At the closed date, a recruiting company offering the highest monthly salary can be successful bidder for obtaining the person ((6)).

The notification for the successful bid is provided to the successfully bidding recruiting company and the job seeker by e-mail.

The e-mail received by the job seeker includes the company name and their telephone number to which he can contact. After that, the job seeker negotiates directly with the successfully bidding company.

The human resource auction site receives payment for the successful bid from the recruiting company having employed the person obtained through the auction.

Details of a configuration of the human resource auction system and a flow of processing therein will be described below.

Figure 2:
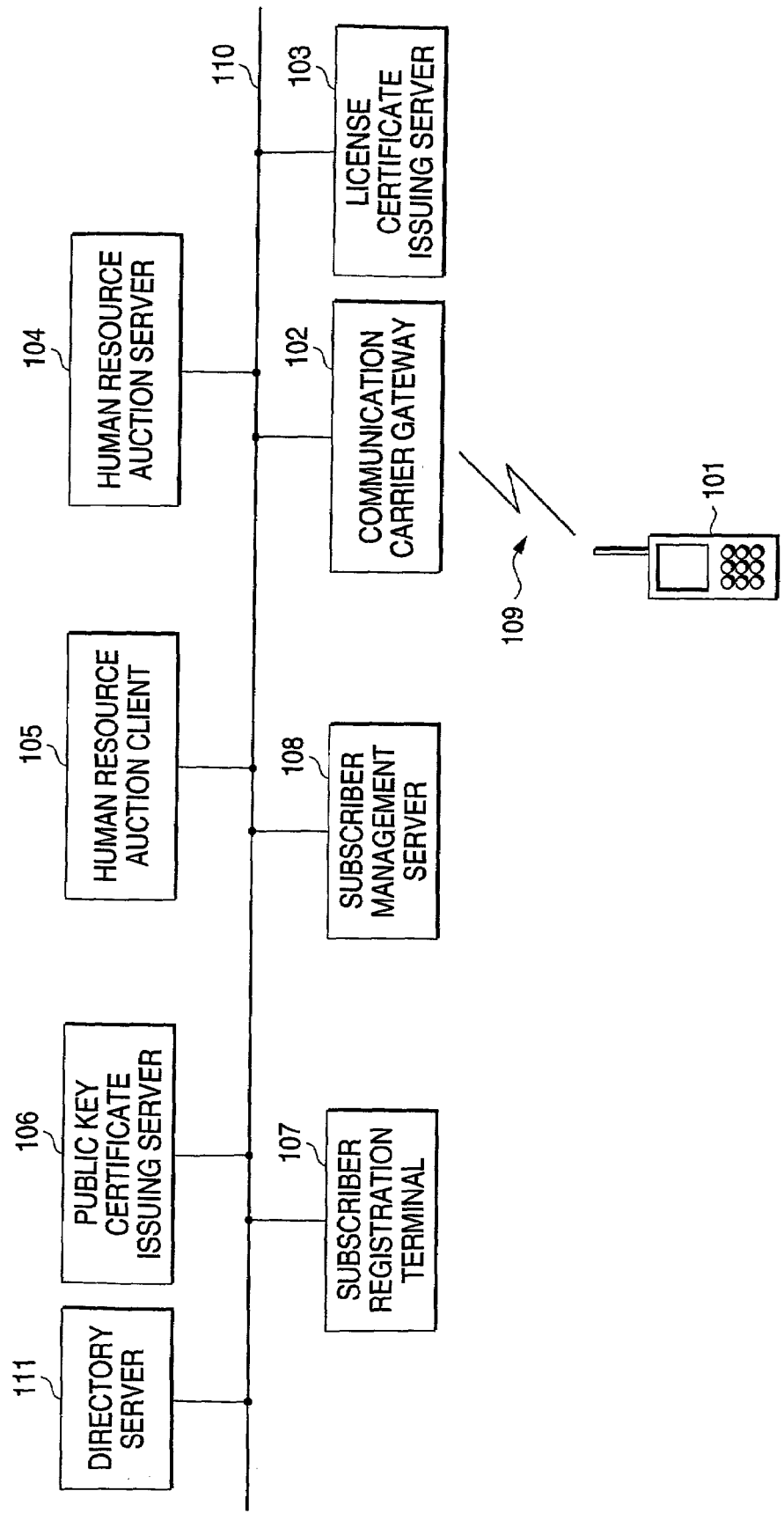
FIG. 2 is a diagram showing a configuration of the first embodiment.

In FIG. 2, the human resource auction system includes a mobile telephone 101 owned by a job seeker, a communication carrier gateway 102 owned by a communication carrier, a license certificate issuing server 103 owned by a license organization, a human resource auction server 104 owned by a human resource auction site, a human resource auction client 105 owned by a recruiting company, a public key certificate issuing server 106, a subscriber registration terminal 107, a subscriber management server 108, a radio network 109, a wired network 110, and a directory server 111. The communication carrier gateway 102 relays between the wired network 110 and the radio network 109. The wired network 110 may be replaced by a radio network. The directory server 111 has a function to return a public key certificate corresponding to a public key certificate ID when the public key certificate ID is given as a request for searching the public key certificate. The public key certificate will be simply called as certificate hereinafter.

Figure 3:
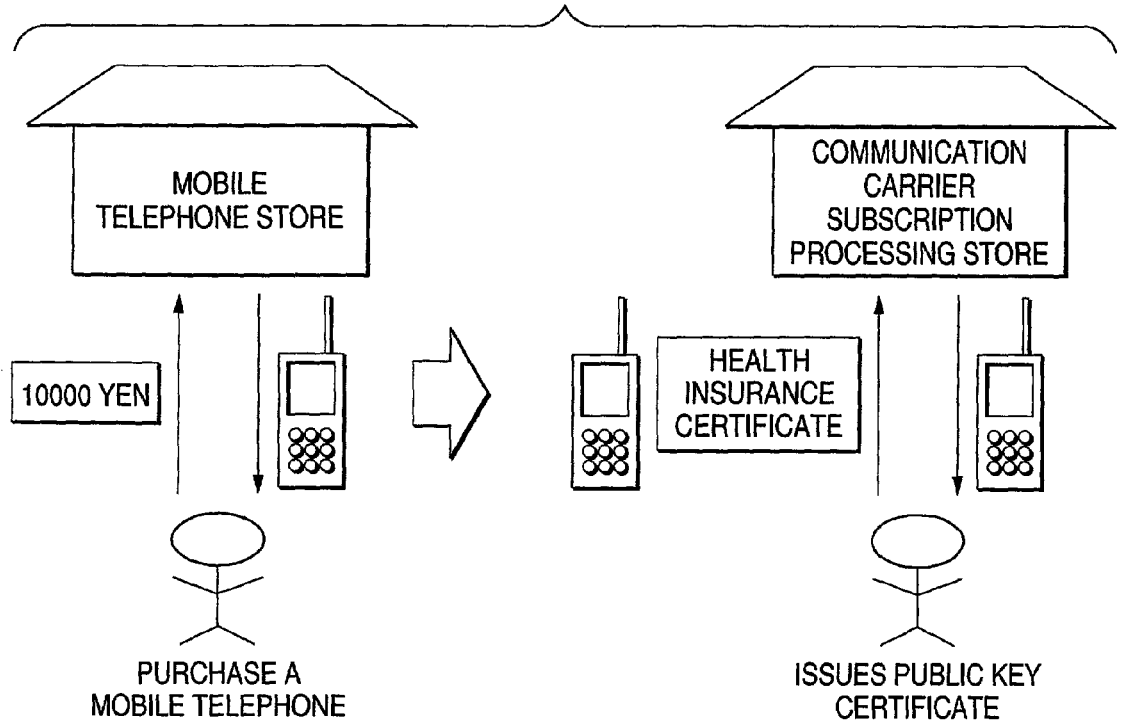
FIG. 3 is an explanatory diagram showing how a job seeker having purchased a mobile telephone subscribes to a communication carrier at a store accepting the subscription.

As shown in FIG. 3, the job seeker purchases the mobile telephone 101 at a mobile telephone store and then subscribes to the communication carrier at a subscription processing store by showing his health insurance certificate for his identification. The steps for the subscription will be described below.

Figure 4:
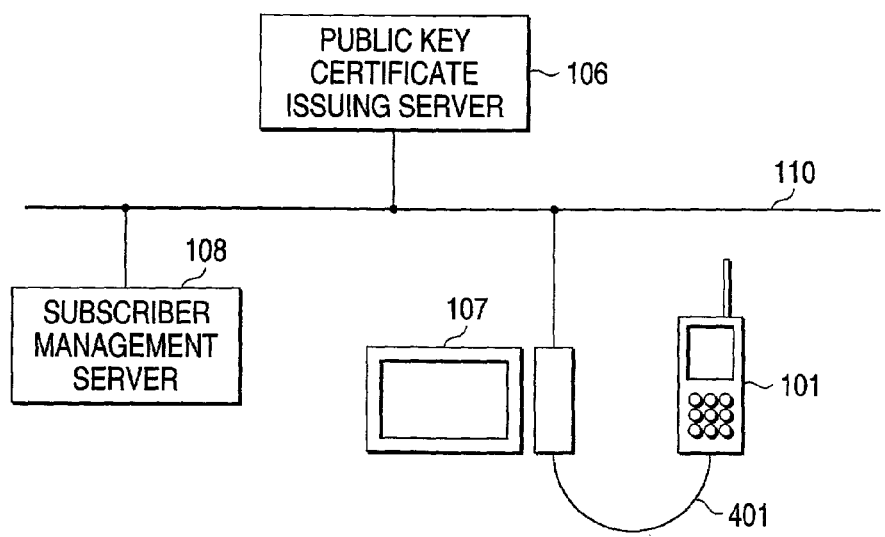
FIG. 4 is a diagram showing a configuration relating to the subscription processing according to the first embodiment.

FIG. 4 shows a configuration relating to the subscription processing.

At the subscription processing store, the job seeker's mobile telephone 101 is connected to the subscriber registration terminal 107 through a communication cable such as a USB cable and an RS232C. The subscriber registration terminal 107 is connected to the subscriber management server 108 and the public key certificate issuing server 106 over the network 110.

The steps of subscription will be described with reference to FIGS. 5 and 6.

The job seeker brings his mobile telephone 101 and his health insurance certificate to the subscription processing store and then writes his personal information including his address, name, birthday and gender on a paper subscription form for subscription. A terminal operator in the communication carrier receives the subscription form and checks whether or not the written personal information is correct with reference to the subscriber's health insurance certificate. If it is correct, the terminal operator connects the subscriber's (that is, job seeker's) mobile telephone 101 to the subscriber registration terminal 107 (step S601).

Figure 5:
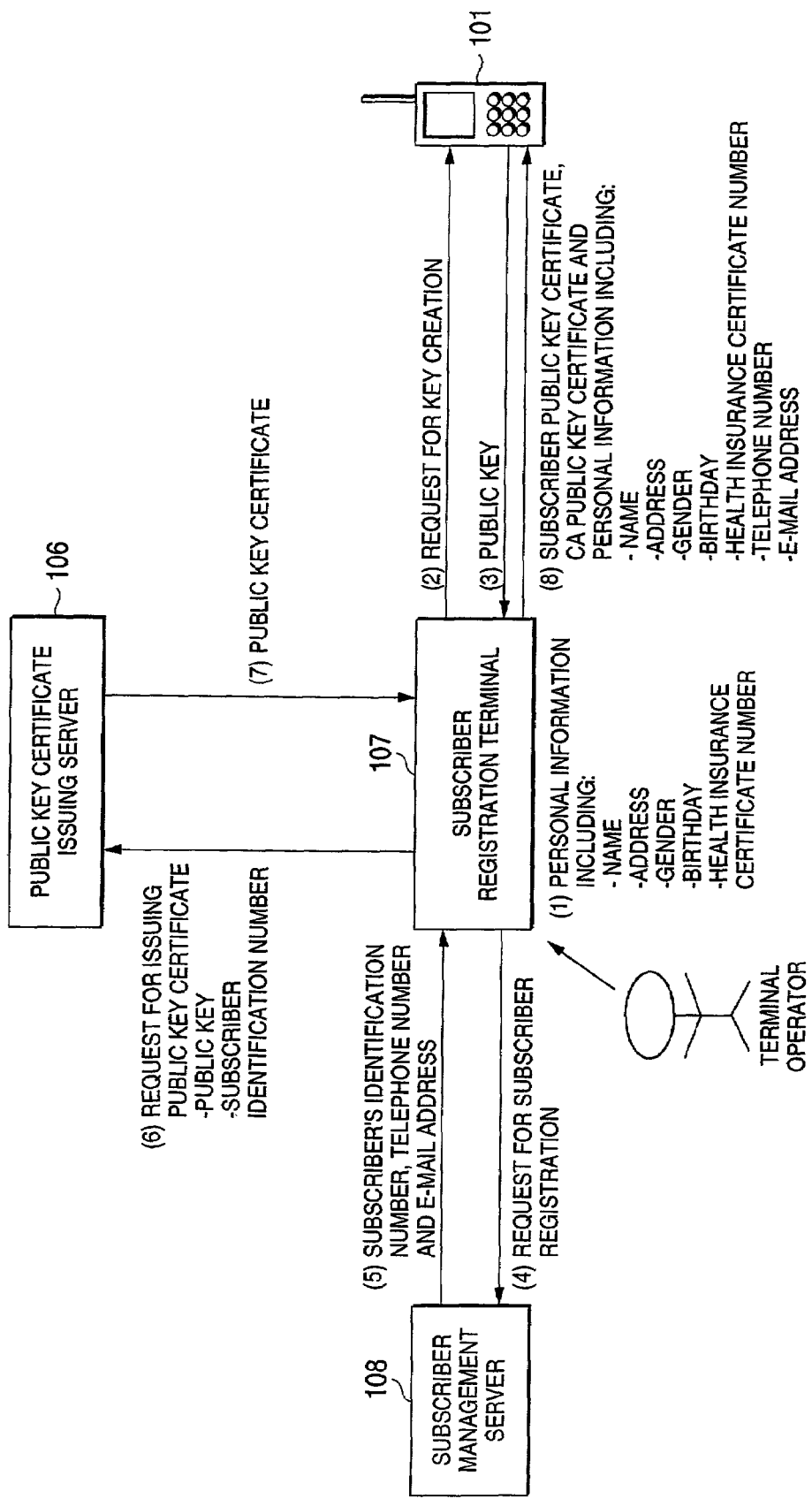
FIG. 5 is an explanatory diagram showing the steps of the subscription according to the first embodiment.
Figure 6:
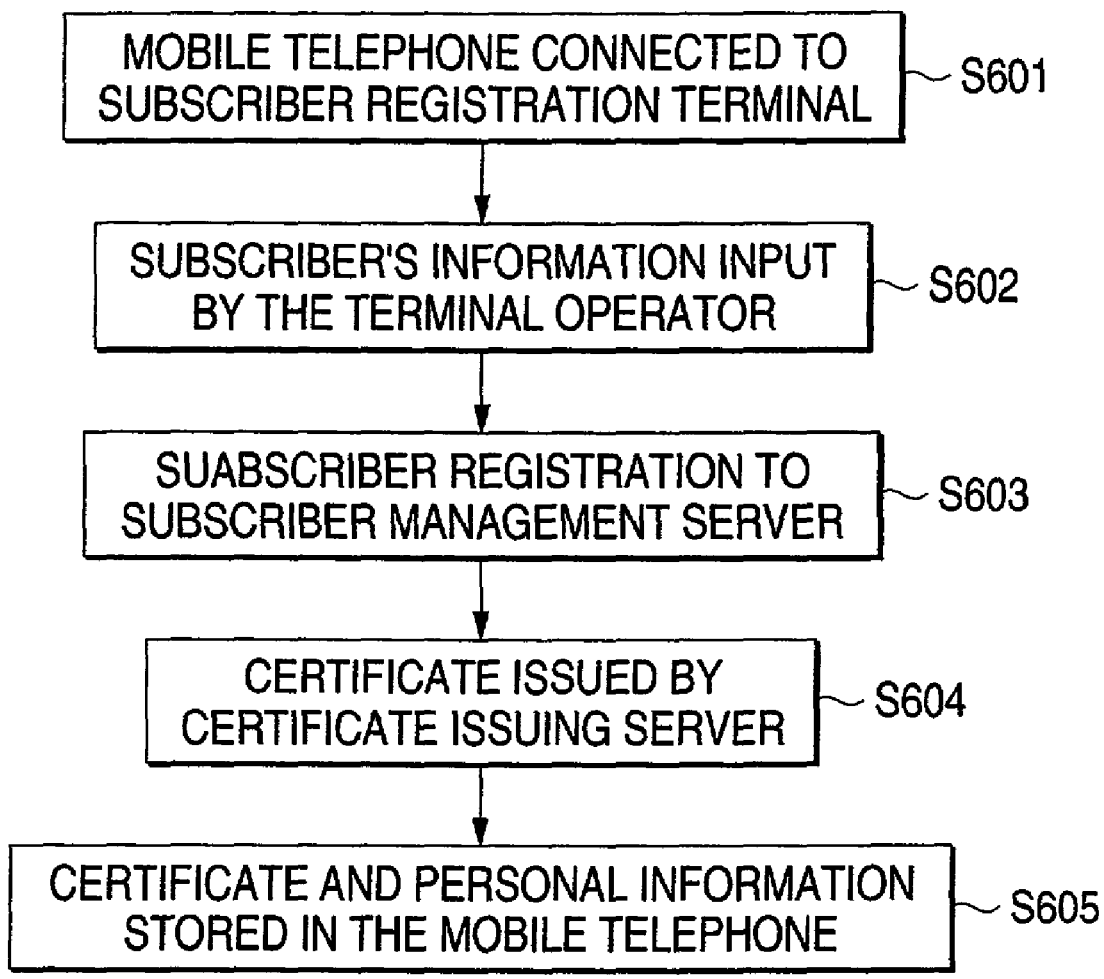
FIG. 6 is a flowchart showing the steps of the subscription according to the first embodiment.

Next, the terminal operator inputs the subscriber's personal information (FIG. 5 (1)) including his address, name, birthday, gender and health insurance certificate number written on the subscription form to the subscription registration terminal 107 (step S602). It may be necessary to register service-plan information and/or other information required for the subscription such as a method of fee payment. However, it is not related to the feature of the present invention, so it will be omitted here.

Next, a request for key creation is sent from the subscription registration terminal 107 to the mobile telephone 101 (FIG. 5 (2)), and then a pair of a public key and a private key is created in the mobile telephone 101 according to the public key encoding method. The created public key is sent to the subscriber registration terminal 107 (FIG. 5 (3)). The pair of created keys may have been stored in the mobile telephone 101 already at the time of purchase of the mobile telephone 101. In that case, a request for obtaining the created public key is sent instead of the request for key creation.

Next, a request for subscriber registration is sent from the subscriber registration terminal 107 to the subscriber management server 108 (FIG. 5 (4)). The request for subscription registration includes items described on the subscription form excluding the subscriber's gender, birthday and health insurance certificate number. The subscriber management server 108 assigns a subscriber identification number, a telephone number and an e-mail address to the subscriber, and subscriber information is registered by using the subscriber identification number as a key (step S603).

After the registration, the subscriber management server 108 sends the newly assigned subscriber identification number, telephone number and e-mail address to the subscriber registration terminal 107 (FIG. 5(5)).

Next, the subscriber registration terminal 107 sends a request for certificate issuing to the public key certificate issuing server 106. The request for certificate issuing includes the public key obtained from the mobile telephone 101 and the subscriber identification number obtained from the subscriber management server 108 (FIG. 5 (6)). The public key certificate issuing server 106 assigns the subscriber identification number as a certificate holder ID and issues and sends a certificate to the subscriber registration terminal 107 (FIG. 5 (7)) (step S604).

Finally, the subscriber's address, name, birthday, gender, health insurance certificate number, telephone number, e-mail address, the issued certificate of the subscriber, and a certificate of a server (CA certificate) having issued the certificate to be used for verification of the subscriber's certificate are sent from the subscriber registration terminal 107 to the mobile telephone 101. Those pieces of information are stored in the mobile telephone 101 (step S605).

In this embodiment, the communication between the subscriber registration terminal 107 and the subscriber management server 108 and the communication between the subscriber management server 108 and the public key certificate issuing server 106 use the encoding communication protocol such as the Secure Socket Layer (SSL) for achieving the mutual authentication and the protection from tapping and falsification.

Figure 7:
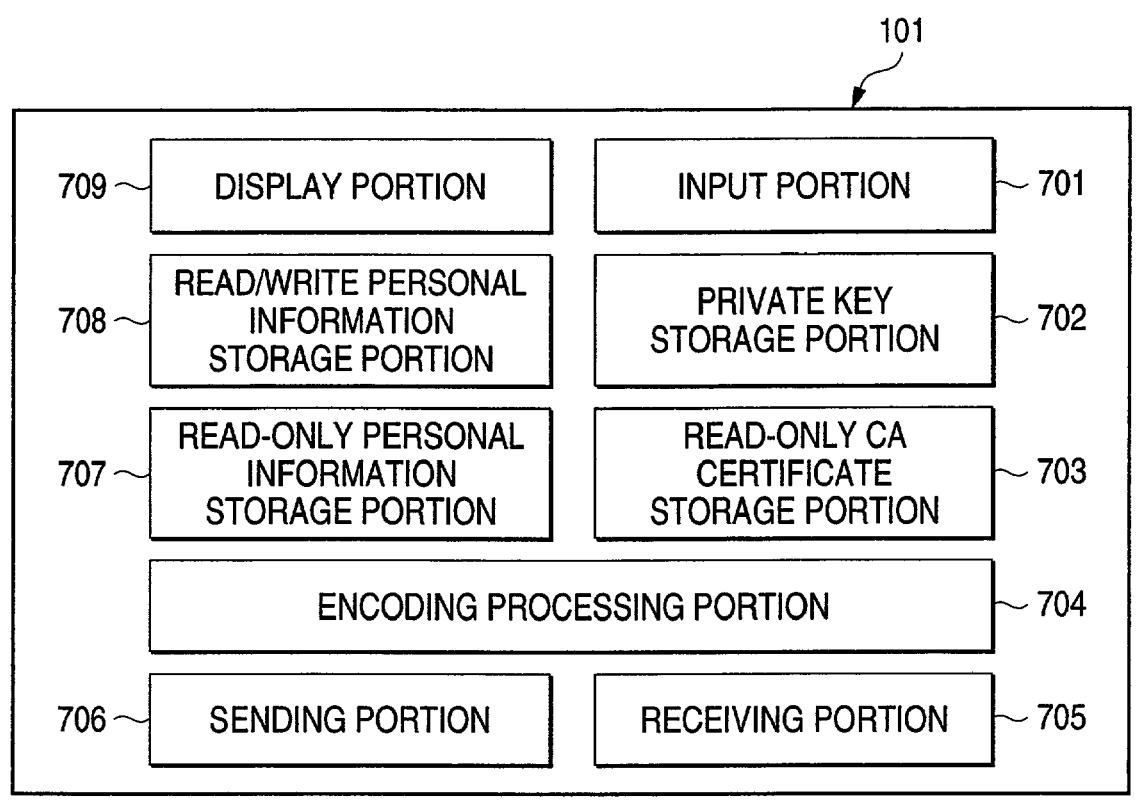
FIG. 7 is a diagram showing a configuration of a mobile telephone.

FIG. 7 shows where the subscriber's address, name, birthday, gender, telephone number, e-mail address, health insurance certificate number and the issued public key certificate are stored in step S605 in relation to the configuration of the mobile telephone 101.

As shown in FIG. 7, the mobile telephone 101 includes an input portion 701 such as push-buttons, a private key storage portion 702 for storing a private key unique to the owner of the mobile telephone 101, a read-only CA certificate storage portion 703 for storing a CA certificate, an encoding processing portion 704, a receiving portion 705, a sending portion 706, a read-only personal information storage portion 707 from which only the owner of the mobile telephone 101 can read, a read/write personal information storage portion 708 where the owner of the mobile telephone 101 can read and write, and a display portion 709 such as a liquid crystal screen.

In step S605, the CA certificate is stored in the CA certificate storage portion 703 where data can be written only once and then reading the data is only possible. Further, the subscriber's name, birthday, gender, health insurance certificate number and telephone number are stored in the read-only personal information storage portion 707 where data can be written only once and after that the data can be only read. The address and the e-mail address may be possibly changed, so they are stored in the read/write personal information storage portion 708 in which the data therein can be rewritten for change. In order to read out information in the read-only personal information storage portion 707 or in the read/write personal information storage portion 708, it is required to input a personal identification number (PIN) code for authenticating a user.

Next, the steps of registering ability information of the job seeker to the human resource auction server will be described.

First of all, the job seeker inputs a URL of the human resource auction site from a browser operated on the mobile telephone 101 in order to access the human resource auction site. Then, a screen 1 in FIG. 8 is displayed. Here, the human resource auction site is called "Online TempStaff".

Next, when a "subscriber page" button is clicked, a subscriber page is displayed (FIG. 8, screen 2). Then, when a "registration" button is clicked, a screen for confirming to disclose the subscriber's e-mail address is displayed (FIG. 8, screen 3). When an "agree" button is clicked, a screen for inputting registration information is displayed (FIG. 8, screen 4). When a "next" button is clicked after the input to each field, a screen for confirming to disclose the subscriber's age and gender is displayed (FIG. 8, screen 5).

Explanation is given about the fact that the disclosure of the subscriber's age means the disclosure of the birthday. When a "next" button is clicked, explanation is given about that to obtain a license certificate from the XXXX Association costs 100 yen and requires the disclosure of the subscriber's health insurance certificate number. Then, it is confirmed whether or not the subscriber agrees with those requirements (FIG. 8, screen 6).

When a "next" button is clicked, a subscriber authentication screen is displayed for accessing his e-mail address, birthday, gender and health insurance certificate number, which are stored in the mobile telephone 101 (FIG. 8, screen 7). The four-digit PIN code is used for person authentication. When an "OK" button is clicked, the agreed requirements regarding the disclosure of user's personal information and fee payment are displayed (FIG. 8, screen 8). On screen 8, the personal information only disclosed to Online TempStaffs, personal information disclosed to recruiting companies, personal information disclosed to the XXXX Association, and the fee to be paid to the XXXX Association are displayed. When an "OK" button is clicked, a signing screen shown in FIG. 9 is displayed.

First of all, screen 9 in FIG. 9 is displayed. The screen 9 displays data to be signed by the user. The to-be-signed data is tagged data indicating that the personal information is disclosed to Online TempStaffs, that the to-be-signed data is created in May 7, 2001, 14:23:30, and that the personal information to be disclosed includes the user's birthday, gender and e-mail address, which are Apr. 1, 1960, Male, and yamada@.aaa.com, respectively. This data is written according to the standard notation.

On the screen 9, an input of the user's PIN code is required for identifying the signing person himself/herself. After his/her PIN code is input and then an "OK" button is clicked, the authentication of the person is performed. If the authentication is successful, his/her signature is created from the to-be-signed data. Then, screen 10 is displayed.

The screen 10 displays data to be signed by the user like the screen 9. The to-be-signed data is tagged data indicating that the personal information is disclosed to the XXXX Association, that the to-be-signed data is created in May 7, 2001, 14:24:30, and that the personal information to be disclosed includes the user's health insurance certificate number, which is 1234567.

Also on the screen 10, an input of the user's PIN code is required for identifying the signing person himself/herself like the screen 10. After his/her PIN code is input and then an "OK" button is clicked, the authentication of the person is performed. If the authentication is successful, his/her signature is created from the to-be-signed data. Then, screen 11 is displayed.

The screen 11 displays data to be signed by the user like the screen 10. The to-be-signed data is tagged data indicating that the fee is paid to the XXXX Association, that the to-be-signed data is created in May 7, 2001, 14:25, and that the amount is 100 yen.

Also on the screen 11, an input of the user's PIN code is required for identifying the signing person himself/herself like the screen 9. After his/her PIN code is input and then an "OK" button is clicked, the authentication of the person is performed. If the authentication is successful, his/her digital signature is created from the to-be-signed data. Then, screen 12 for ending the processing is displayed.

Next, a message flow in accordance with operations on screens by the user will be described with reference to FIGS. 10, 11, 12, 13, 14, 15 and 16.

An application program is downloaded when the user accesses the Online TempStaff Site (FIG. 10, (1)). Since then, screens 1 to 12 are displayed in accordance with logic implemented in the application program. The communication between the application program and the human resource auction server 104 does not occur until an "OK" button on the screen 11 as shown in FIG. 9 is clicked.

Figure 13:
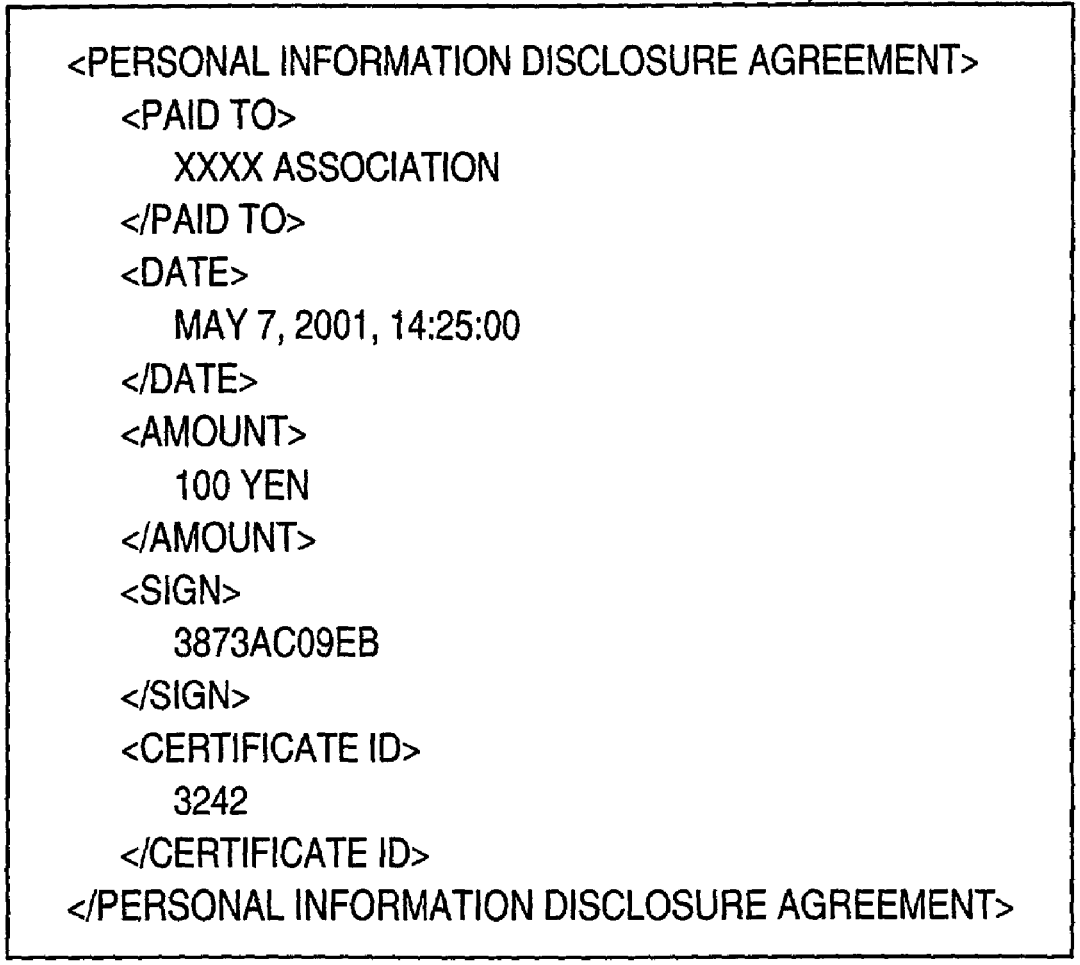
FIG. 13 is a diagram showing data on a agreement for fee payment.
Figure 14:
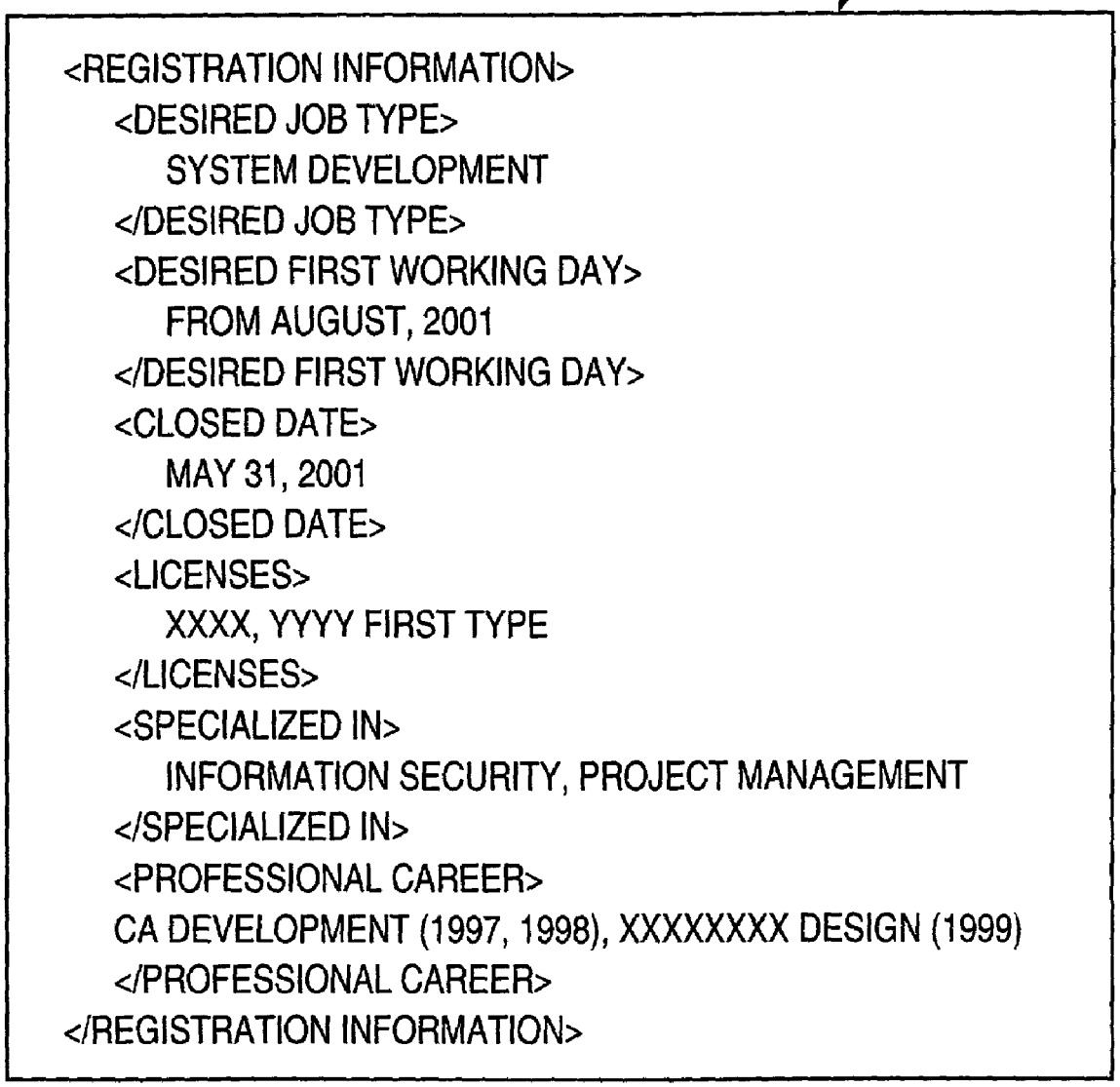
FIG. 14 is a diagram showing data on other registered information.

When the "OK" button is clicked on the screen 11 as shown in FIG. 9, the agreement 1101 (FIG. 10 (2)) for the disclosure of the job seeker's birthday, gender and e-mail address shown in FIG. 11, the agreement 1201 (FIG. 10, (3)) for the disclosure of his/her health insurance certificate number, shown in FIG. 12, the agreement 1301 (FIG. 10 (4)) for fee payment, shown in FIG. 13, and the other registration information 1401 (FIG. 10, (5)), shown in FIG. 14 are sent by the application program to the human resource auction server 104. The job seeker's signs are given by means of the private key of the mobile telephone owner (job seeker), which is stored in the mobile telephone, to the to-be signed data provided on the screen 9 in FIG. 9, the screen 10 in FIG. 9, the screen 10 in FIG. 9 and the screen 11 in FIG. 9, respectively. The birthday, gender and e-mail address disclosure agreement 1101, the health insurance certificate number disclosure agreement 1201 and the fee payment agreement 1301 include the signature (identified by the tag "SIGN" in the figures) and certificate ID required for the verification of the signatures.

The human resource auction server 104 obtains a certificate corresponding to the certificate ID from the directory server 111 in order to verify signatures on the received data. If the verification is succeeded, an ID unique to the user is assigned. The ID is called auction registered user ID hereinafter.

The human resource auction server 104 stores in the database the birthday, gender- and e-mail address disclosure agreement 1101, the health insurance certificate number disclosure agreement 1201, the fee payment agreement 1301, the other registration information 1401 and the certificate ID by using the auction registration user ID as a key.

If the human resource auction server 104 determines that XXX is included in the job seeker's licenses in the other registration information 1401, the human resource auction server 104 sends a request 1501 for license certificate issuance to the license certificate issuing server (license organization server) 103.

As shown in FIG. 15, the request 1501 for license certificate issuance is data including the name of the license certificate requestor, the requested date, the health insurance certificate number disclosure agreement 1101, the fee payment agreement 1301, signatures given thereto by means of the private key held by the human resource auction server 104, and the certificate ID required for the verification of the signatures.

The license certificate issuing server 103 receives the request 1501 for license certificate issuance and then obtains the certificate corresponding to the certificate ID from the directory server 111 in order to verify the signature on the received data. If the verification is succeeded, the license certificate issuing server 103 verifies the sign on the health insurance certificate number disclosure agreement 1201 included in the request 1501 for license certificate issuance. If it is determined that the user (subscriber) really agrees with the disclosure of the health insurance certificate number based on the verification, the signature on the fee payment agreement 1301 is verified. If it is determined that the user (subscriber) really agrees with the fee payment based on the verification, a license certificate 1601 shown in FIG. 16 is issued to the human resource auction server 104 (FIG. 10, (7)).

The license certificate 1601 is data including the name of the license issuer, the license holder certificate ID, the name of the license, the score, the date of the license examination, signature given thereto by means of the private key held by the license certificate issuing server 103, and the certificate ID required for the verification of the signature.

The request 1701 for fee collection is data including the name of the fee collection requestor, the requested data, the fee payment agreement 1301, the name of the license issuer, the-name of the license, the score, the date of the license examination, signature given thereto by means of the private key held by the license certificate issuing server 103, and the certificate ID required for the verification of the signs.

The request 1701 for fee collection is data including the name of the fee collection requestor, the requested data, the fee payment agreement 1301, the name of the license issuer, the name of the license, the score, the date of the license examination, signs given thereto by means of the private key held by the license certificate issuing server 103, and the certificate ID required for the verification of the signs.

The subscriber management server 108 obtains the certificate corresponding to the certificate ID from the directory server 111 in order to verify the signature on the received data. If the verification is succeeded, the signature on the fee payment agreement 1301 included in the request 1701 for fee collection is verified. If it is determined that the user (subscriber) really agrees with the disclosure of the fee payment based on the verification, a response 1801 to the fee collection request shown in FIG. 18 is sent to the license certificate issuing server 103 (FIG. 10 (9)).

The response 1801 to the fee collection request is data including the name of the fee collecting party, the requested date of the fee collection, the planned date of the fee payment, signatures given thereto by means of the private key held by subscriber management server 108, and the certificate ID required for the verification of the signatures.

The subscriber management server 108 adds the amount to be collection to the communication charge billed to the user who is the subscriber and collects the fee from the user thereby. The communication carrier subtracts the collection charge from the amount of the collected fee. Then, the rest of the amount is transferred to the XXXX Association that is the license organization.

On the other hand, the human resource auction server 104 having obtained the license certificate 1601 identifies the auction registered user ID based on the certificate ID included in the license certificate 1601. Then, the human resource auction server 104 stores the license certificate 1601 in the database by using the auction registered user ID as a key. Then, the health insurance certificate number disclosure agreement 1201 corresponding to the -auction registered user ID is removed from the human resource auction server 104. This is because the health insurance certificate number is no longer needed by the human resource auction server 104.

Then, a human resource auction is held based on the user's information stored by using the certificate ID as the key.

FIG. 19 shows how the human resource auction proceeds.

First of all, there is an access from the human resource auction client 105 that is a terminal of a recruiting company to the Online TempStaff (FIG. 19, screen 1). When the "Recruiting Company Page" button is clicked, a screen for authenticating the recruiting company is displayed (FIG. 19, screen 2). A company ID and the password are entered thereon. If the authentication is succeeded, a page for the accessing company is displayed (FIG. 19, screen 3). When a "Search for Job seekers" button is clicked, a screen for entering the search requirements is displayed (FIG. 19, screen 4). The required specialty, age, gender and license information are entered on the search screen, and then a "Search" button is clicked. Then, auction information belonging to the person matching with the requirements is displayed (FIG. 19, screen 5).

It is a feature of the present invention to use a score XXX of a searched job seeker which is guaranteed by the XXXX association when searching a person matching with the job requirements. As organizations for issuing objective ability information as the license certificate increases, a job seeker matching with the needs of the recruiting company can be selected accurately and quickly. In this embodiment, a single piece of license information such as XXX is used. Further, various requests from recruiting companies and job seekers can be handled quickly by using several different pieces of license information.

Screen 5 in FIG. 19 shows that there are three hits for job seekers with IDs 23454, 10345 and 45489. The IDs are assigned to the job seekers by the auction site at the time of their registration. The Current Bided Amount (monthly), the Number of Bids, the End Date are the highest monthly salary offered by one of recruiting companies, the number of bidding recruiting companies and the auction final date, respectively. The auction final date is the last biddable date having registered by the job seeker at the time of his registration.

When one of IDs matched through the search is clicked, personal information and ability information of the job seeker corresponding to the ID is displayed (FIG. 19, screen 6).

The screen 6 displays items of the job seeker's age, gender, licenses, desired job type, specialty and professional career and values therefor. The description "guaranteed" following a value indicates that the value is guaranteed by a third party organization. In this example, the age and the gender are guaranteed by the communication carrier, and the score XXX is guaranteed by the XXX Association. The other values without the description "guaranteed" are subjective information entered by the job seeker.

The information which can be viewed by recruiting companies on the screen 6 does not include unnecessary personal information in consideration of the job seeker's privacy. The examples of the personal information not needed for the recruiting companies are job seeker's name, and telephone number which are not disclosed by the job seeker to the human resource auction site and job seeker's health insurance certificate number, e-mail address, and certificate ID, which are disclosed by the job seeker to the human resource auction site.

The recruiting company determines whether bidding or not based on the contents displayed on the screen 6. For bidding, a "Bid" button is clicked. Then, a screen for entering an amount of bidding is displayed (FIG. 19, screen 7).

In order to place a bid, the highest price than the current bid must be entered. Screen 7 shows an example where 1,100,000 yen is entered which is higher than the current bid 1,000,000 yen. When the "OK" button is clicked, the bid is confirmed.

At the end of the auction, the recruiting company having offered the highest salary can obtain the desired job seeker successfully. The acknowledgement of the successful bid is sent to the successfully bid recruiting company and the job seeker.

The e-mail received by the job seeker includes the name of the successfully bid company and their telephone number. After that, the job seeker can negotiate with the company directly.

The human resource auction site receives a reward from the recruiting company having employed the person successfully bid in the auction.

As described above, in the first embodiment, recruiting companies use the license certificate provided by the license organization as objective ability information of the job seeker. Therefore, the needs of both job seeker and recruiting company can be matched accurately and quickly, which allows the reduction of costs on both of them.

Further, the job seeker can select which personal information he/she would disclose. Since only the information agreed for the disclosure is disclosed, the illegal leak of personal information can be prevented.

Further, the server having obtained personal information indirectly provides a way for checking if the personal information is disclosed in accordance with the agreement by the person that the personal information belongs to. Therefore, the use of illegally leaked personal information can be prevented.

On the other hand, the license organization can verify that the personal information is disclosed in accordance with the agreement by the person the personal information belongs to. Further, the license organization can verify that the job seeker requesting the license certificate issuance agrees on the payment of issuance fee. Furthermore, the license certificate issuance fee can be collected by the communication carrier instead. Therefore, the electronic license certificate can be issued securely. Additionally, the license organization and the communication carrier can get earnings through the issuance of the license certificate.

Further, since the application program is downloaded from the human resource auction server to the job seeker's terminal, the version-up of the application can be handled in a flexible way.

Second Embodiment

In this embodiment, a value of the health insurance certificate number in the health insurance certificate number disclosure agreement 1201 is encoded so that only the license organization using the value can decode it. FIG. 20 shows the health insurance certificate number disclosure agreement where the health insurance certificate number is encoded.

In order to encode the health insurance certificate number, the mobile telephone 101 obtains from the directory server 111 in FIG. 2 a certificate issued by a license organization XXXX Association needing the health insurance certificate number. Then, the mobile telephone 101 verifies the certificate and uses a public key included in the certificate to encode the health insurance certificate number. Then, the health insurance number disclosure agreement 2001 is sent. On the other hand, the license certificate issuing server 103 receives a request for issuance of a license certificate including the health insurance certificate number disclosure agreement 2001 and decodes the encoded health insurance certificate number by using a private key held by the license certificate issuing server 103. The processings other the above are same as the first embodiment.

According to this embodiment, the job seeker can provide his/her health insurance certificate number which is personal information to the license certificate issuing server 103 without the disclosure to the human resource auction server 104. Further, the human resource auction server 104 does not need to prevent the leakage of the health insurance certificate number, which is personal information and is actually not needed by the human resource auction server 104. Therefore, the cost reduction can be achieved.

Third Embodiment

In this embodiment, the processing steps up to auction site registration by the job seeker are different from those in the first embodiment. The auction by recruiting companies after the job seeker's registration is performed in the same manner as the first embodiment.

In the first embodiment, the online human resource auction site obtains the license certificate of the job seeker. On the other hand, in this embodiment, the job seeker himself/herself receives the license certificate directly from the license organization and uses it for the registration in the human resource auction site. FIG. 21 shows a flow of the data.

First of all, in response to an access from the mobile telephone 101 to the license certificate issuing server 103, an application program for performing processing for obtaining the license certificate is downloaded (FIG. 21, (1)). The application program operated on the mobile telephone 101 obtains a health insurance certificate number from the mobile telephone 101 under the permission of the user of the mobile telephone 101. The application program creates a request 2301 (FIG. 23) for license certificate issuance and sends it to the license certificate issuing server 103 (FIG. 21 (2)). FIG. 24 shows operations for obtaining the license certificate, which are operated on the mobile telephone 101.

The license certificate issuing server 103 receives the request 2301 for license certificate issuance and then verifies the signature thereon in the same manner as that in the first embodiment. After that, a license certificate 2401 (FIG. 24) is issued (FIG. 21 (3)). The issued license certificate 2401 is stored in the read/write personal information storage portion 708 in FIG. 7.

The license certificate issuing server 103 sends a request for fee collection to the subscriber management server 108 (FIG. 21, (4)) in the same manner as that in the first embodiment. The subscriber management server 108 returns a response indicating the acceptance of the request for fee collection to the license certificate issuing server 103 (FIG. 21, (5)).

FIG. 22 shows screens displayed on the user's mobile telephone 101.

When there is an access to the site of the XXXX Association (screen 1) and an "Issue License Certificate" button is clicked, screen 2 is displayed. The screen 2 asks the agreement on the disclosure of the user's health insurance certificate number and on the payment of the fee 100 yen. When the user clicks the "NEXT" button, screen 3 is displayed. In the screen 3, the authentication of the user is required in order to read his/her health insurance certificate number stored in the mobile telephone 101. When four-digit PIN code is entered and then the "OK" button is clicked, information on which the user agreed through the operations up to that point is displayed (screen 4). When the "OK" button is clicked, a license certificate is issued and then is stored in the mobile telephone 101.

Figure 25:
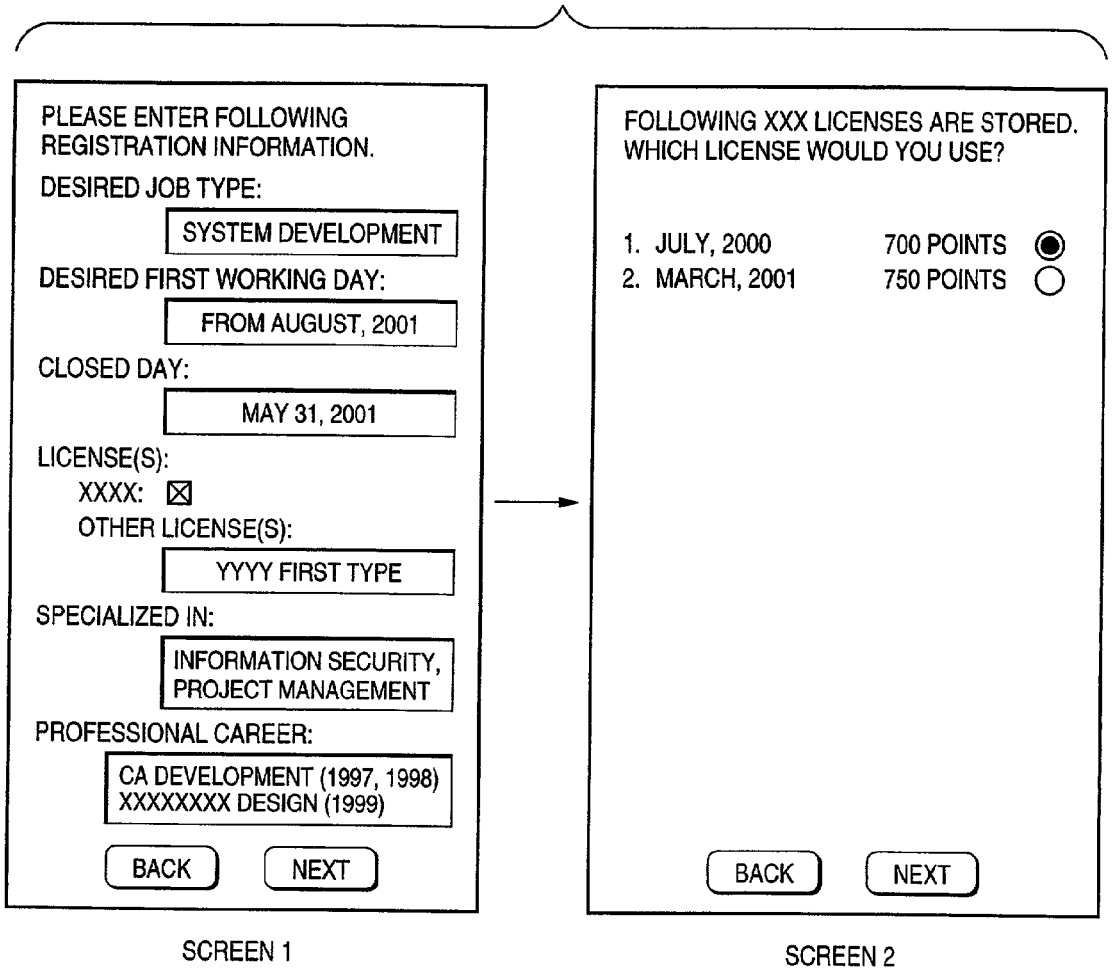
FIG. 25 is a diagram showing an example of a screen where a job seeker states his/her ability.

The access by the user to the human resource auction server 104 is performed in the same manner as that in the first embodiment. First of all, in response to the access to the human resource auction server 104, an application program is downloaded (FIG. 21, (7)). Next, the downloaded application program sends registration information (FIG. 21, (8) and (9)). The difference from that in the first embodiment is an operation in the processing for creating the registration information. It is checked that the user holds the XXXX license on screen 1 in FIG. 25 (FIG. 8, screen 4). Then, a list of XXXX license certificates stored in the mobile telephone 101 is displayed on the next screen (FIG. 25, screen 2). In other words, the screen is added where the user can select which license in the list is used for the registration. Further, the screens in FIGS. 8 and 9 for entering and displaying information required for obtaining a license certificate are no longer necessary.

The application program determines that the license certificate is stored in the read/write storage portion 708 in the mobile telephone 101 in the following manner: First of all, data with a <license certificate> tag are chosen from the information stored in the read/write storage portion 708 and are listed. Next, one or more licenses with a license name value of XXX are selected from the list, and the list of the selected licenses are displayed.

The agreement 1101 of the disclosure of user's birthday, gender and e-mail address and the registration information 2601 are sent from the mobile telephone 101 to the human resource auction server 104. The difference between the registration information 2601 and the registration information 1401 is that the registration information 2601 includes a license certificate following the license.

In this embodiment, the license certificate can be stored in the mobile telephone. Thus, payment for license certificate issuance is no longer necessary for each of the several registrations in the same human resource auction site or for each of registration to different human resource auction sites.

Further, the application program is downloaded from the license certificate issuing server to the job seeker's (user's) terminal. Therefore, the version-up of the application can be handled in a flexible way.

Fourth Embodiment

This embodiment is for reducing the step of inputting personal information on a screen by a user at the time of service registration.

FIG. 31 shows the operations by a user according to the fourth embodiment.

First of all, there is an access from the mobile telephone 101 to a site where the user needs registration (FIG. 31, screen 1). When a "To Register" button is clicked, a conventional general mobile telephone displays a screen where the input fields such as user's name, address and telephone number are empty as shown in FIG. 31, screen 4. However, in this embodiment, a screen for asking agreement on reading out the user's name, gender, address and telephone number stored in the personal information storage portion of the mobile telephone 101 is displayed as shown in FIG. 31, screen 3. Then, a correct PIN code is entered for authenticating the user and an "OK" button is clicked. Then, the user's name, gender, address and telephone number stored in the personal information storage portion are read out, and they are automatically entered to the input field to be entered by the user.

Figures 27, 28:
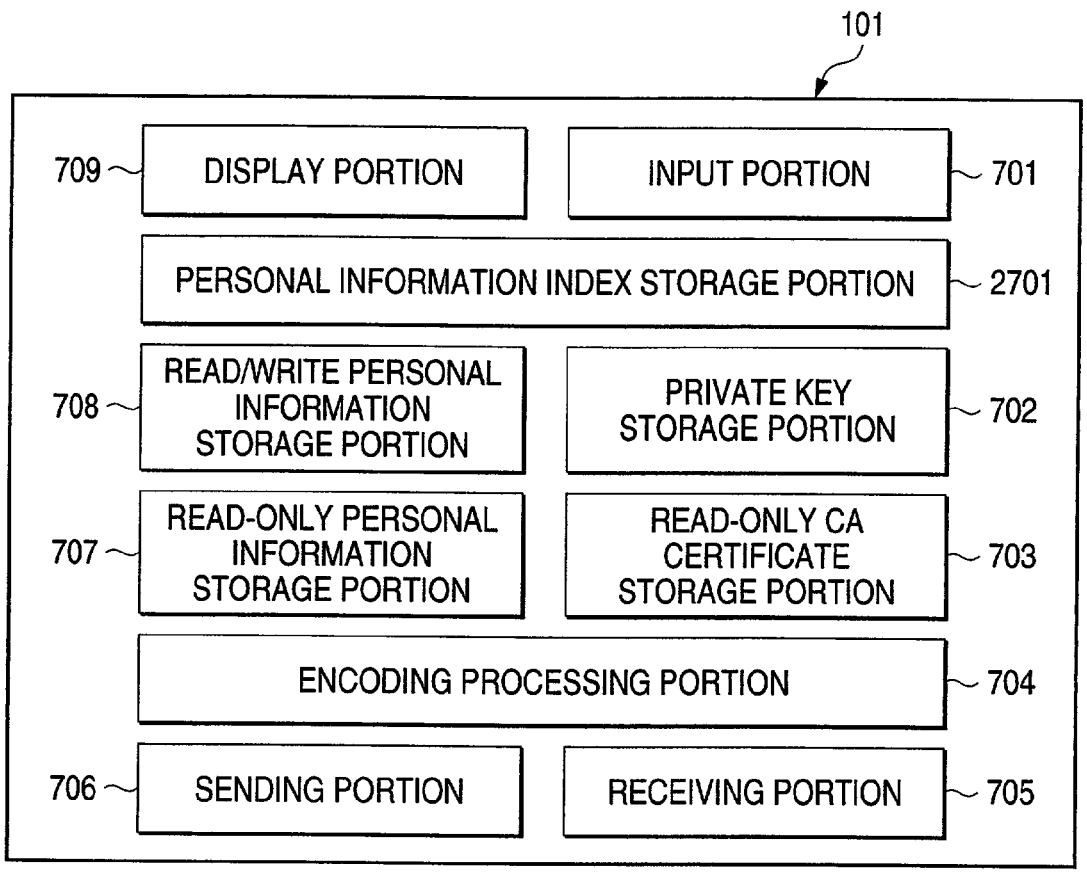
FIG. 27 is a diagram showing a configuration of a mobile telephone.
FIG. 28 is a diagram showing tagged personal information stored in a personal information storage portion in the mobile telephone.

FIG. 27 shows a configuration of the mobile telephone 101. In FIG. 27, a personal information index storage portion 2701 is added to the configuration in FIG. 7.

Indices of personal information stored in the read/write personal information storage portion 708 and the read-only personal information storage portion 707 are stored in the personal information index storage portion 2701. Further, the indices stored in the personal information index storage portion 2701 can be read by an application program running on the mobile telephone 101 without any user authentication processing such as PIN code inputting.

FIG. 29 is an example where user's address and e-mail address which are personal information with higher frequency of change are stored with tags indicating respective title in the read/write personal information storage portion 708. Further, FIG. 30 is an example where the user's name, telephone number (contract mobile telephone's number), gender, birthday and health insurance certificate number which are personal information with lower frequency of change are stored with respective title tags in the read/write personal information storage portion 708. FIG. 28 shows that tags for personal information stored in the read/write personal information storage portion 708 and the read-only personal information storage portion 707 are stored as indices.

The application program holds tag names for information titles to be entered in the input fields. Then, the tag names are used to search for information to be stored in respective input fields in the personal information index storage portion 2701. Thus, it can be determined that whether or not the respective pieces of the information exist in the personal information storage portion (708 or 707).

As a result of the search, if an applicable tag name is included in the indices, the personal information corresponding to the applicable tag name is read out from the personal information storage portion (708 or 707), which is then entered into the input field instead of the user. In order to read out the personal information from the personal information storage portion (708 or 707), the input of the PIN code is asked to the user.

According to this embodiment, the user can prevent the illegal leak of his/her personal information and can reduce the step of complicated personal information inputting.

Fifth Embodiment

At the time of the storage of the personal information in the mobile telephone shown in FIG. 5, (8) in the first embodiment, the subscriber registration terminal 107 or the terminal operator in FIG. 2 or FIG. 4 adds signatures to each piece of personal information of the user's name, address, gender, birthday and health insurance certificate number in this embodiment. Then, the signed name, address, gender, birthday and health insurance certificate number are stored in the mobile telephone 101.

FIG. 32 shows how the user's name, address, gender, birthday and health insurance certificate number are signed in the subscriber registration terminal 107.

Personal information is indicated by values between a pair of tags indicating corresponding a title of the piece of personal information, a certificate ID, and a signing person certificate ID. The identification certificate ID is a certificate ID of the owner of the mobile telephone for indicating who the personal information belongs to.

Further, the signed person certificate ID is a certificate ID which is assigned to the subscriber registration terminal or the operator of the terminal for identifying the subscriber terminal or the operator of the terminal who have signed.

The signatures are signed by the subscriber registration terminal or the operator of the terminal.

FIG. 33 is an example where the health insurance certificate number on the personal information disclosure agreement shown in FIG. 12 is changed to the signed health insurance certificate number. The signature on the personal information disclosure agreement is verified based on the certificate corresponding to the certificate ID (3242 in FIG. 33) of the owner of the mobile telephone 101 written between <certificate ID> and </certificate ID> in FIG. 32. On the other hand, the signed health insurance certificate number guaranteed by the subscriber registration organization includes the certificate ID (3242 in FIG. 32) of the owner of the health insurance certificate number. A service provider having received the personal information disclosure agreement can identify that the health insurance certificate number is of the creator of the personal information disclosure agreement, which is guaranteed by the subscriber registration organization, based on the identity of those values of the certificate ID.

In this way, the subscriber registration terminal or the operator of the terminal adds signatures to each piece of personal information separately so that the server which receives the personal information can realize that those pieces of the personal information are guaranteed by the subscriber registration organization. As a result, it can be prevented that a user of the mobile telephone creates false personal information on purpose, signs on the false personal information and sends it to the server.

The prevention of registration with the false age or gender by a job seeker can improves the reliability of the job seeker information in the online human resource auction system. Thus, the value of the online human resource auction site is increased.

One example of the sites needing highly reliable age and/or gender information is a dating site. The dating site implements a system whereby profile information is posted by one person on the bulletin board which can be viewed by the general public, and the other person preferring the contents of the profile can contact to the person posted on the bulletin board by means of e-mail.

In consideration of the privacy issue, name, address and telephone number information is usually not disclosed on the bulletin board. However, the gender and the age are posted in most of time since they are important information for selecting a partner. According to this embodiment, age and/or gender information registered by the registrant can be guaranteed by the subscriber registration organization of the registrant's mobile telephone. Therefore, the value of the dating site is also increased.

What is claimed is:

1. A human resource auction system, comprising:
a human resource auction server for performing a human resource auction between multiple recruiting companies bidding on services of a job seeker, the human resource auction server being configured to:
receive a bid electronically from each of the multiple recruiting companies for the services of the job seeker,
automatically determine which of the received bids is the highest by comparing the received bids, and
automatically generating and transmitting an electronic notification identifying which recruiting company submitted the highest bid and thus is the successful bidder;
a job seeker terminal used by the job seeker, the job seeker terminal being configured to receive the transmitted electronic notification;
a client of the recruiting company determined to be the successful bidder;
a license organization server for providing a license certificate; and
a network for connecting the human resource auction server, the job seeker terminal, the client and the license organization server in a radio or wired manner,
wherein the client in the recruiting company uses the license certificate provided by the license organization as objective ability information of the job seeker.

2. The human resource auction system according to claim 1, further comprising:
a subscriber management server of a communication carrier,
wherein the subscriber management server of the communication carrier collects a fee for license certificate issuance as a communication charge from an account of a user of the job seeker terminal instead of the license organization server.

3. The human resource auction system according to claim 1, wherein
the license organization server of the license organization downloads an application program to the job seeker terminal for displaying a screen for requesting authorization from the job seeker for obtaining a license certificate,
when a request for license issuance is made by the job seeker terminal under the authorization by the job seeker based on the application program, the license organization server issues and sends to the job seeker terminal the license certificate, which is in turn stored by the job seeker terminal, and
when registering for the human resource auction, the job seeker terminal sends the license certificate to the human resource auction server.

4. The human resource auction system according to claim 1, wherein
the human resource auction server obtains, from the job seeker, contents of personal information of the job seeker,
the human resource auction server downloads an application program to the job seeker terminal for obtaining authorization from the job seeker to disclose the contents of personal information to disclosed servers, the application program being used to obtain authorization for disclosing different pieces of personal information of the job seeker to different disclosed servers, and
upon receiving the authorization from the job seeker based on the application program, the human resource auction server discloses to the different disclosed server the respective different pieces of the contents of personal information of the job seeker.

5. The human resource auction system according to claim 1, wherein the job seeker terminal sends encoded personal information, which can be decoded by the license organization server only, to the license organization server to be stored as encoded information.

6. The human resource auction system according to claim 1, wherein
the human resource auction server downloads to the job seeker terminal an application program for obtaining information indicating whether or not the job seeker agrees on fee payment for license certificate issuance, and
if the job seeker's agreement is realized by the application program, the human resource auction server notifies the license organization server that the fee payment is agreed upon by the job seeker, and the license organization server issues and transfers to the human resource auction server a license certificate based on the agreement on the fee payment.

7. The human resource auction system according to claim 1, wherein
the job seeker terminal stores a heading of personal information on a storage area which can be read without any password, and an application program running on the job seeker terminal searches the storage area so that the heading of personal information stored in the job seeker terminal can be identified, and
in accordance with permission of the job seeker, the application program reads applicable contents of personal information from a storage area of the job seeker terminal which cannot be read without permission of the job seeker and enters the applicable contents in a personal information entering field on a screen.

8. The human resource auction system according to claim 1, further comprising:
a subscriber management server of a communication carrier,
wherein the human resource auction is performed based on personal information of the job seeker, and each piece of the personal information is signed by the subscriber management server and stored in the job seeker terminal.

9. The human resource auction system according to claim 1, wherein the system further comprises:
a subscriber management server operated by a communication carrier on the network, the subscriber management server being adapted to collect a fee for license certificate issuance as a communication charge from an account of a user of the job seeker terminal instead of the license organization server.

10. The human resource auction system according to claim 1, wherein the system further comprises:
a license organization server that issues and sends to the job seeker terminal a license certificate in accordance with a request from the job seeker terminal.

11. The human resource auction system according to claim 1, wherein the system further comprises:
a license organization server adapted to receive encoded personal information from the job seeker terminal and decode the personal information for purpose of issuing a license certificate for the job seeker to be used during the human resource auction.

12. The human resource auction system according to claim 1, wherein the system further comprises:
a subscriber management server operated by a communication carrier on the network, the subscriber management server being adapted to sign each piece of the personal information, each signed piece of the personal information being stored in the job seeker terminal.

13. The human resource auction system according to claim 1, wherein the job seeker terminal is a mobile telephone.

14. An auction server for performing a human resource auction in a human resource auction system, the auction server being configured to:
register a job seeker terminal used by a job seeker for the auction, the job seeker terminal being connected to the human resource auction server via a radio-based or wire-based network;
receive personal information of the job seeker from the job seeker terminal at the time of registration for the auction;
automatically determine a successful bid for the job seeker's services by comparing a plurality of bids received electronically from clients of a plurality of recruiting companies, the clients being connected to the human resource auction server via the network; and
when personal information of the job seeker is received from the job seeker terminal at the time of registration for the auction, identify the job seeker's license information in the personal information;
obtain a license certificate relating to the job seeker from a license organization server in response to identifying the job seeker's license information, the license organization server being connected to the human resource auction via the network, the license certificate corresponding to the identified job seeker's license information; and
automatically transmit the license certificate to the client of the recruiting company which transmitted the successful bid.

15. The human resource auction server according to claim 14, wherein the human resource auction server downloads an application program to the job seeker terminal for obtaining authorization from the job seeker to disclose the personal information to disclosed servers, the application program being used to obtain authorization for disclosing different pieces of the personal information to different disclosed servers, and
upon receiving the authorization from the job seeker based on the application program, the human resource auction server discloses to the different disclosed servers the respective different pieces of the personal information of the job seeker.

16. The human resource auction server according to claim 14, wherein the human resource auction server is adapted to:
download to the job seeker terminal an application program for obtaining information indicating whether or not the job seeker agrees on fee payment for license certificate issuance,
if the job seeker's agreement is realized by the application program, notify the license organization server that the fee payment is agreed upon by the job seeker, and obtain a license certificate from the license organization server based on the agreement on the fee payment.

* * * * *